US012774061B2

(12) United States Patent
Xu

(10) Patent No.: US 12,774,061 B2
(45) **Date of Patent: *Oct. 27, 2026**

(54) INFLATABLE PADDLE BOARD AND THERMAL BONDING METHOD THEREOF

(71) Applicant: YOUNGER TIME PTE. LTD., Singapore (SG)

(72) Inventor: Zhongwen Xu, Rongcheng City (CN)

(73) Assignee: YOUNGER TIME PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 19/203,178

(22) Filed: May 9, 2025

(65) Prior Publication Data

US 2026/0217339 A1 Jul. 30, 2026

(30) Foreign Application Priority Data

Jan. 24, 2025 (CN) ......................... 202510120712.5
Apr. 29, 2025 (CN) ......................... 202510558664.8
Apr. 29, 2025 (CN) ......................... 202510558818.3

(51) Int. Cl.

| | |
|---|---|
| ***B63B 32/51*** | (2020.01) |
| ***B32B 1/00*** | (2024.01) |
| ***B32B 7/09*** | (2019.01) |
| ***B32B 27/08*** | (2006.01) |
| ***B32B 27/30*** | (2006.01) |
| ***B32B 27/40*** | (2006.01) |
| ***B63B 32/40*** | (2020.01) |
| ***B63B 32/57*** | (2020.01) |
| ***B63B 32/59*** | (2020.01) |

(52) U.S. Cl.

CPC ................ *B63B 32/51* (2020.02); *B32B 1/00* (2013.01); *B32B 7/09* (2019.01); *B32B 27/08* (2013.01); *B32B 27/304* (2013.01); *B32B 27/40* (2013.01); *B63B 32/40* (2020.02); *B63B 32/57* (2020.02); *B63B 32/59* (2020.02); *B63B 2231/52* (2013.01)

(58) Field of Classification Search

CPC ......... B63B 32/00; B63B 32/40; B63B 32/50; B63B 32/51; B63B 32/57; B63B 32/59; B63B 2231/52

See application file for complete search history.

(56) References Cited

U.S. PATENT DOCUMENTS 11,305,845 B2 * 4/2022 Hawthorne ............... B63B 3/48
12,377,939 B2 * 8/2025 Huang ....................... B63B 7/08
12,466,521 B1 * 11/2025 Xu .......................... B63B 32/57
12,545,372 B1 * 2/2026 Xu .......................... B63B 32/51

(Continued)

FOREIGN PATENT DOCUMENTS

CN 208544403 U * 2/2019
CN 209581799 U * 11/2019

(Continued)

*Primary Examiner* — Ajay Vasudeva
(74) *Attorney, Agent, or Firm* — Che-Yang Chen

(57) ABSTRACT

An inflatable paddle board includes a main body having a head portion and a peripheral enclosing strip which is thermally bonded with the main body to form an inflation chamber, wherein a length of a top head layer is smaller than a length of a bottom head layer, so as to cause the inflatable paddle board to form a raised head when the inflation chamber is inflated.

10 Claims, 38 Drawing Sheets

(56) References Cited

U.S. PATENT DOCUMENTS

| | | | | |
|---|---|---|---|---|
| 2006/0222842 | A1 * | 10/2006 | Thezier | B63B 32/57 428/319.3 |
| 2022/0081077 | A1 * | 3/2022 | Huang | B63B 32/51 |
| 2023/0322337 | A1 * | 10/2023 | Zeng | B63B 32/77 441/66 |

FOREIGN PATENT DOCUMENTS

| | | | | |
|---|---|---|---|---|
| CN | 210364286 | U | * | 4/2020 |
| CN | 211107898 | U | * | 7/2020 |
| CN | 222347260 | U | * | 1/2025 |

* cited by examiner

INFLATABLE PADDLE BOARD AND THERMAL BONDING METHOD THEREOF

CROSS REFERENCE OF RELATED APPLICATION

This application is a non-provisional application that claims priority under 35U.S.C. § 119 to China application number CN202510120712.5, filing date Jan. 24, 2025, China application number 202510558664.8, filing date Apr. 29, 2025, and China application number 202510558818.3, filing date Apr. 29, 2025, wherein the entire content of which is expressly incorporated herein by reference.

BACKGROUND OF THE PRESENT INVENTION

Field of Invention

The present invention relates to paddle board, and more particularly to an inflatable paddle board and thermal bonding method thereof.

Description of Related Arts

Inflatable paddle boards are essential equipment for water surfing and other sports. They must be able to float on water while maintaining a certain level of hardness and firmness. In traditional manufacturing, paddle boards are typically made of PVC drop stitch fabrics which are bonded together by a PVC side enclosing strip using a glue. However, this glue bonding method has several drawbacks, including requiring a large production area, a high number of operators, high manufacturing costs, an increased risk of leaks, a short lifespan, and poor aesthetics.

The firmness of a paddle board bonded with glue is compromised, and poor-quality adhesive may cause the board to break. Additionally, glue contains a significant amount of volatile harmful substances. In paddle board manufacturing workshops, the bonding process must be done manually, exposing workers to the strong, pungent odor of the glue, which poses serious health risks and is not environmentally friendly.

The glue undergoes aging over time due to prolonged exposure to environmental factors such as humidity, temperature fluctuations, and UV radiation. As the glue deteriorates, it gradually loses its adhesion strength, causing the bond between the PVC layers to weaken. This degradation process can lead to air leakage in the paddle board, compromising its buoyancy, structural integrity, and overall performance.

Additionally, the aging of the glue may result in the formation of cracks or delamination, further accelerating air loss and reducing the paddle board's lifespan. This not only affects the user experience but also increases maintenance costs and the likelihood of premature product failure. Therefore, relying solely on glue bonding presents significant durability concerns, highlighting the need for a more reliable and long-lasting bonding method.

Given the issues of weak bonding and environmental hazards associated with the current glue bonding method, there is an urgent need for a better approach to attaching the PVC layers of the inflatable paddle boards. An improved method should enhance the strength and quality of the bond, reduce the presence of harmful substances in the adhesive, and provide a safer, more environmentally friendly manufacturing process for inflatable paddle boards.

SUMMARY OF THE PRESENT INVENTION

The invention is advantageous in that it provides an inflatable paddle board and thermal bonding method thereof, wherein thermal bonding process does not require the use of glue or reduce the use of the use to bond the drop stitch layers by a peripheral enclosing strip, thereby avoiding the harm of harmful substances in the glue to the health of operators and being more environmentally friendly; reduces the construction area occupied, and does not require a large area to be reserved for glue bonding operations, reduces the workload of operators, improves production efficiency, and reduces production costs.

Another advantage of the present invention is to provide an inflatable paddle board and thermal bonding method thereof which make the drop stitch fabric and the peripheral enclosing strip more firmly bonded, reduces the air leakage rate of the product, improves the product quality and service life, and the appearance of the product after heat sealing is smoother and more beautiful, thereby improving the product quality.

Another advantage of the present invention is to provide an inflatable paddle board and thermal bonding method thereof, wherein the manufacturing process can enable the inflatable paddle board to form a structure with a raised head after being inflated.

Another advantage of the present invention is to provide an inflatable paddle board and thermal bonding method thereof, which reduces manual participation, saves labor costs, and improves production efficiency through automated positioning and automated heat-sealing process.

The present invention provides a method for manufacturing an inflatable paddle board by thermal bonding two drop stitch layers by a peripheral enclosing strip, wherein the peripheral enclosing strip can be a PVC mesh fabric serving as as a side enclosing edging wrapped around the edges of two layers of the drop stitch fabrics, and the bonding process is a heat-sealing process rather than a glue bonding process.

In a fixing step of the two layers of the drop stitch fabrics, two layers of the drop stitch fabrics with matching sizes and shapes are first cut, and then the two layers of the drop stitch fabrics are aligned, and the two layers of the drop stitch fabrics are pressed down by driving two pressing posts to make the two layers produce a virtual solder connection, so that the two layers of the drop stitch fabrics can be fixed and not easily misaligned in the subsequent heat sealing process. The two pressing posts can be pressed down at a predetermined interval to perform the dot-fixing process, and the two edges of the drop stitch fabrics are aligned and connected by virtual soldering through a device similar to a high-frequency electric welder, so that the two layers of the drop stitch fabrics are fixed together by dot-pressing. The pressing step starts from the tail of the two layers of the drop stitch fabrics until it is pressed to about a half to three quarters of the overall length.

It is understandable that the above-mentioned dot-fixing connection process can be completed automatically by a spot welding machine, or can be completed by a manual process. In addition, in another variant implementation, the two layers of the drop stitch fabrics can also be fixed by glue.

In the present invention, an upper layer of the drop stitch fabric layer during manufacturing is scraped and wrinkled, and the front end of the upper layer is in a backward position relative to the front end of the lower layer. Specifically, upper and lower vacuum cylinders can be controlled by an operating table to suck the drop stitch fabric material so that it is in a fixed position relative to the machine platform, and the upper vacuum cylinder is moved toward the tail of the material to displace the drop stitch fabric material up and down.

The upper and lower layers of the drop stitch fabrics continue to be pressed and fixed, wherein the conveying speeds of the upper conveying member and the lower conveying member are different. Specifically, the speed of the upper conveying member is greater than that of the lower conveying member, and the upper layer will be temporarily fixed with the lower layer during the pressing process and produce small wrinkles, and the pressing step continues until no wrinkle is on the upper layer. Then, the excess part of the front end of the lower layer of drop stitch fabric is cut off. It can be understood that in the finished product, the lower layer is the top layer of the finished product, and its length is relatively reduced because a part is cut off, so that the two layers of drop stitch fabrics are inflated to form a structure with a raised head.

In the thermal bonding step, align the PVC peripheral enclosing strip with the two drop stitch fabric layers to ensure that the edges of the two are flat and not misaligned. The PVC peripheral enclosing strip covers the edges of the two drop stitch fabric layers and is fixed with a clamp or a positioning device. Then heat the contact part of the PVC peripheral enclosing strip and the drop stitch fabric layers to a melting temperature, so that the contact surface between the PV C peripheral enclosing strip and the drop stitch fabrics is in a molten state, and the heating speed and temperature uniformity are controlled to avoid local over-heating or insufficient heating. The heat sealing time depends on factors such as the thickness of the material, the heat sealing temperature and pressure.

During the pressing operation, the contact surface of the PVC peripheral enclosing strip and the drop stitch fabric layers are pressed together by a pressing roller machine, and hot air is provided by a hot air blower. The fluidity of the molten state is stronger than that of the solid state, so that the PVC peripheral enclosing strip and the drop stitch fabric layers are fully in contact and fused together, ensuring uniform and stable pressure.

It is understandable that the above embodiment uses a material of PVC and PVC drop stitch fabrics (the surface is a PVC layer), which is also applicable to other materials that are in a molten state after heating, such as PVC and TPU, TPU and TPU. The heat-sealing temperature will be determined by testing according to the materials used.

According to an aspect, the present invention provides an inflatable paddle board, comprising:

- a main body comprising two body layers; and
- a peripheral enclosing strip which is integrated with the two body layers by thermal bonding to form an inflation chamber between the two body layers and the peripheral enclosing strip.

According to an embodiment, the peripheral enclosing strip comprises one or more strip parts which are wrapped around edges of the two body layers.

According to an embodiment, the peripheral enclosing strip comprises a plurality of strip parts which are connected with each other.

According to an embodiment, the plurality of strip parts are integrated with each other without requiring a glue to bond two adjacent strip parts.

According to an embodiment, before a thermal bonding process for bonding the peripheral enclosing strip and the two body layers, the plurality of strip parts are integrated with each other to form the peripheral enclosing strip comprising two end portions and a strip body between the two end portions, wherein two adjacent strip parts of the strip body are gluelessly bonded with each other.

According to an embodiment, the two end portions of the peripheral enclosing strip are two sealing ends which are bonded with each other after the thermal bonding process through one of a thermal bonding manner and a gluing manner.

According to an embodiment, each strip part of the peripheral enclosing strip comprises two surface layers and a mesh layer between the two surface layers, each mesh layer comprises a plurality of first yarns and a plurality of second yarns which are perpendicular to each other.

According to an embodiment, the plurality of first yarns and the plurality of second yarns are respectively inclined with respect to a length direction of the peripheral enclosing strip.

According to an embodiment, an inclined angle between the first yarn and the length direction of the peripheral enclosing strip is 30°-60°.

According to an embodiment, an inclined angle between the first yarn and the length direction of the peripheral enclosing strip is 45°.

According to an embodiment, a decoration strip is attached on the peripheral enclosing strip, the decoration strip comprises a plurality of strip parts each comprising a plurality of first yarns and a plurality of second yarns which are perpendicular to each other, wherein the first yarns and the second yarns in one or more of the plurality of strip parts are inclined yarns with respect to a length direction of the peripheral enclosing strip.

According to an embodiment, the main body comprises a head portion and a tail portion, wherein each of the head portion and the tail portion are bonded with two strip parts which have different yarn patterns.

According to an embodiment, the main body comprises a plurality of connecting threads connected between the two body layers, a width of a portion of the peripheral enclosing strip between edges of the two body layers is smaller than a height of the connecting threads between the two body layers, wherein the connecting threads between the edges of the two body layers are removed or cut off in the middle.

According to an embodiment, the first yarns and the first yarns of the two strip parts on two sides of each of the head portion and the tail portion are arranged in mirrored sloping lines.

According to an embodiment, between the two end portions, along one of a clockwise direction and a counterclockwise direction, an end edge of each preceding strip part of the strip body is positioned below or above an end edge of the next strip part.

According to an embodiment, the peripheral enclosing strip comprises a middle strip, an upper strip integrated on an upper edge of the middle strip and a lower strip integrated on a lower edge of the middle strip.

According to an embodiment, each of the middle strip, the upper strip and the lower strip comprises two surface layers and a mesh layer between the two surface layers, wherein each mesh layer comprises a plurality of first yarns and a plurality of second yarns which are perpendicular to each other, the first yarns and the second yarns in each of the upper strip and the lower strip are inclined yarns with respect to the length direction of the peripheral enclosing strip.

According to an embodiment, the two body layers are PVC or TPU drop stitch fabrics, wherein a plurality of connecting threads are connected between the two body layers.

According to an embodiment, each surface layer of each strip part of the peripheral enclosing strip is made of PVC or TPU, the mesh layer is made of a fiber material selected from the group consisting of polyester terylene fiber, nylon and aramid fiber.

According to another aspect, the present invention provides an inflatable paddle board, comprising: a main body comprising a head portion, wherein the head portion comprises a top head layer and a bottom head layer; and a peripheral enclosing strip which is thermally bonded with the main body to form an inflation chamber, wherein a length of the top head layer is smaller than a length of the bottom head layer, so as to cause the inflatable paddle board to form a raised head when the inflation chamber is inflated.

According to an embodiment, the main body comprises two body layers, the top head layer and the bottom head layer are respectively parts of the two body layers, the peripheral enclosing strip is integrated with the two body layers to define the inflation chamber.

According to an embodiment, when the inflation chamber is inflated, the top head layer and the bottom head layer are curved layers extending upward to form the raised head.

According to an embodiment, each of the top head layer and the bottom head layer comprises a bending edge, during a thermal bonding process between the two body layers and the peripheral enclosing strip, the bending edges of the top head layer and the bottom head layer are aligned and overlapped with each other in an edge-to-edge manner, the peripheral enclosing strip is wrapped on the bending edges of the top head layer and the bottom head layer, after the thermal bonding process, the top head layer is spaced apart from the bottom head layer to cause the inflatable paddle board to form the raised head when the inflation chamber is inflated.

According to an embodiment, each of the top head layer and the bottom head layer comprises a bending edge, wherein during a thermal bonding process between the two body layers and the peripheral enclosing strip, the bending edges of the top head layer and the bottom head layer are aligned with each other and have a same perimeter length, after the thermal bonding process, the top head layer is spaced apart from the bottom head layer to cause the inflatable paddle board to form the raised head when the inflation chamber is inflated.

According to an embodiment, before the thermal bonding process, a top material layer and a bottom material layer are temporarily fixed and the top material layer is wrinkled on the bottom material layer, so as to allow a front end portion of the bottom material layer to be exposed, wherein the front end portion of the bottom material layer is cut off so as to allow the top material layer and the bottom material layer to provide the two body layers.

According to an embodiment, the two body layers comprise a top body layer and a bottom body layer, wherein the bottom material layer forms the top body layer while the top material layer forms the bottom body layer.

According to an embodiment, during the thermal bonding process, the bending edges of the top head layer and the bottom head layer are temporarily fixed by virtual solder connection points.

According to an embodiment, a length of the front end portion of the bottom material layer is 3 cm-7 cm, a length of the head portion of the main body is 60 cm-120 cm, a height of a bottom edge of the peripheral enclosing strip is 3 cm-20 cm when the inflatable paddle board is inflated.

According to an embodiment, a width of an overlapping area between the peripheral enclosing strip and each of the top head layer and the bottom head layer is 0.5 cm-3 cm.

According to an embodiment, wherein the peripheral enclosing strip comprises a plurality of strip parts which are connected with each other, the plurality of strip parts comprises a first strip part and a second strip part which are connected with each other and are thermally bonded with said top head layer and said bottom head layer at two sides of the head portion.

According to an embodiment, the first strip part and the second strip part are integrated with each other without requiring a glue to bond the two adjacent strip parts.

According to another aspect, the present invention provides a system for manufacturing an inflatable paddle board, wherein the inflatable paddle board comprises a main body comprising two body layers, and a peripheral enclosing strip which is integrated with the two body layers by thermal bonding to form an inflation chamber between the two body layers and the peripheral enclosing strip, wherein the system comprises a thermal bonding device which comprises a support table for supporting the two body layers and the peripheral enclosing strip which is wrapped on edges of the two body layers, a pressing roller assembly for clamping the body layers and the peripheral enclosing strip, and a hot air blower for thermal bonding the peripheral enclosing strip with the two body layers of the main body.

According to an embodiment, the system further comprises a fixing arrangement for temporarily fixing the two body layers, wherein the fixing arrangement comprises a support platform for placing two material layers which are used to provide the two body layers, and two pressing posts which are driven to generate virtual solder connection points between the two material layers.

According to an embodiment, the fixing arrangement further comprises a scraping element for scraping a top material layer of the two material layers for generating a wrinkle part of the top material layer, and a conveying assembly for conveying the two material layers, wherein after the top material layer is formed with a wrinkle part, a front end portion of a bottom material layer of the two material layers is exposed and cut off, so as to provide the two body layers, wherein the top material layer is used to provide a bottom body layer of the two body layers, the bottom material layer is used to provide a top body layer of the two body layers.

According to an embodiment, the conveying assembly comprises an upper conveying member and a lower conveying member, wherein a conveying speed of the upper conveying member is greater than a conveying speed of the lower conveying member.

According to an embodiment, the system further comprises a cutting arrangement which comprises a conveyor platform for conveying a strip material, a cutting assembly for inclinedly cutting the strip material to provide a strip part of the peripheral enclosing strip, wherein each strip part of the peripheral enclosing strip comprises two surface layers and a mesh layer between the two surface layers, each mesh layer comprises a plurality of first yarns and a plurality of second yarns which are perpendicular to each other, when the strip part is inclinedly cut off from the strip material, the plurality of first yarns and the plurality of second yarns are respectively inclined with respect to a length direction of the strip part.

According to an embodiment, the system further comprises a bonding arrangement which comprises a pressing block and a thermal pressing piece, wherein when the pressing block is placed on two end edges of the two strip parts, the thermal pressing piece is driven to be placed on the pressing block to thermal bonding the two end edges of the two strip parts.

According to an embodiment, the system further comprises an end coupling arrangement which comprises a thermal heating piece or being driven to be placed at a position corresponding to two end portions of the peripheral enclosing strip for bonding the two end portions of the peripheral enclosing strip after the thermal bonding process for bonding the peripheral enclosing strip with the two body layers of the main body.

A method for manufacturing an inflatable paddle board, comprising the following steps:

overlap two body layers of a main body; and thermal bonding a peripheral enclosing strip with the two body layers to form an inflation chamber between the two body layers and the peripheral enclosing strip.

According to an embodiment, the method further comprises the steps of clamping the body layers and the peripheral enclosing strip by a pressing roller assembly, and thermal bonding the peripheral enclosing strip with the two body layers of the main body by a hot air blower.

According to an embodiment, the method further comprises a step of temporarily fixing the two body layers for aligning and attaching the two body layers with each other before the thermal bonding process, wherein when the inflatable paddle board is inflated, the two body layers are spaced apart from each other.

According to an embodiment, the method further comprises the steps of scraping a top material layer of two material layers for generating a wrinkle part of the top material layer, and cutting off a front end portion of a bottom material layer of the two material layers, so as to provide the two body layers, wherein the top material layer is used to provide a bottom body layer of the two body layers, the bottom material layer is used to provide a top body layer of the two body layers.

According to an embodiment, the method further comprises a step of inclinedly cutting a strip material to provide a strip part of the peripheral enclosing strip, wherein each strip part of the peripheral enclosing strip comprises two surface layers and a mesh layer between the two surface layers, each mesh layer comprises a plurality of first yarns and a plurality of second yarns which are perpendicular to each other, when the strip part is inclinedly cut off from the strip material, the plurality of first yarns and the plurality of second yarns are respectively inclined with respect to a length direction of the strip part.

According to an embodiment, the method further comprises a step of thermal bonding two end edges of two adjacent strip parts to provide the peripheral enclosing strip, wherein between two end portions which are bonded after the thermal bonding process, along a clockwise or counterclockwise direction, the end edge of each preceding strip part is positioned below the end edge of the next strip part, or the end edge of each preceding strip part is positioned above the end edge of the next strip part.

DETAILED DESCRIPTION OF THE PREFERRED EMBODIMENT

Figure 1:
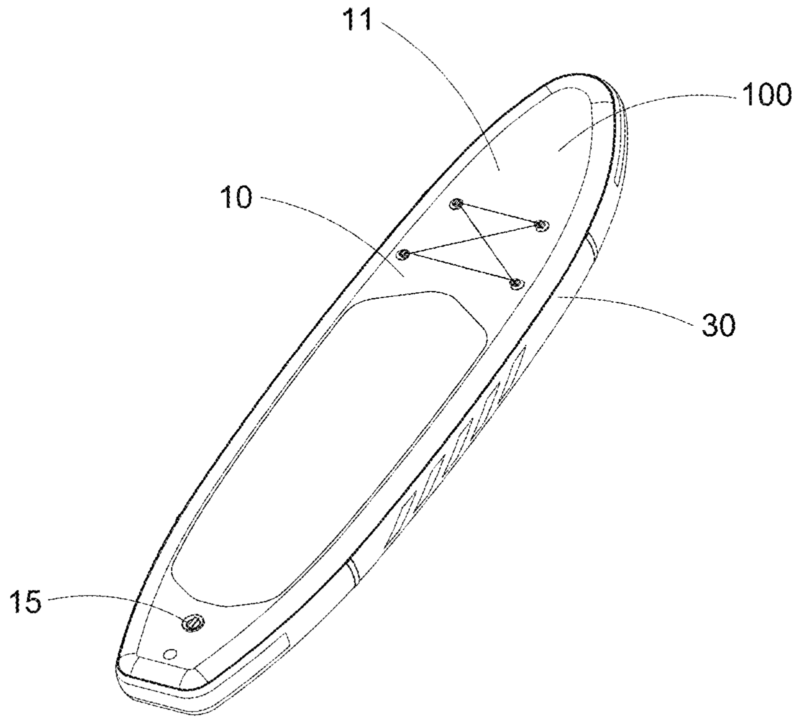
FIG. 1 is a perspective view of an inflatable paddle board according to a preferred embodiment of the present invention.

The following description is disclosed to enable any person skilled in the art to make and use the present invention. Preferred embodiments are provided in the following description only as examples and modifications will be apparent to those skilled in the art.

The general principles defined in the following description would be applied to other embodiments, alternatives, modifications, equivalents, and applications without departing from the spirit and scope of the present invention.

Referring to FIG. 1 to FIG. 35 of the drawings, an inflatable paddle board 100 according to a preferred embodiment of the present invention is illustrated, the inflatable board 100 comprises a main body 10 comprising two body layers which can be a top body layer 11 and a bottom body layer 12, and a plurality of connecting threads 13 extended between the two body layers 11 and 12, a peripheral enclosing strip 20 bonded to edges 110 and 120 of the two body layers 11 and 12 respectively to define an inflation chamber 14 between the two body layers and the peripheral enclosing strip 20, and an inflation valve 15 for inflating the inflation chamber 14.

In this embodiment, connecting threads 13 at the edges 110 and 120 of the two body layers 11 and 12 can be eliminated or cut off in the middle, areas within the edges 110 and 120 of the two body layers 11 and 12 are provided with the connecting threads 13, so as to facilitate the thermal bonding between the peripheral enclosing strip 20 and the edges 110 and 120 of the two body layers 11 and 12.

The two body layers 11 and 12 serve as the top and bottom structural layers of the board. Between these two body layers 11 and 12, a plurality of the connecting threads 13 are arranged. These connecting threads 13 are extended between the top and bottom body layers 11 and 12, and are essential for maintaining the shape and structural integrity of the inflatable paddle board 100 when inflated. Actually, the connecting threads 13 help the board resist excessive expansion and deformation, ensuring that it maintains a rigid and flat surface similar to a solid board when fully inflated.

The peripheral enclosing strip 20 is bonded to the edges 110 and 120 of the two body layers 11 and 12, sealing the perimeter of the inflatable paddle board 100. The inflation chamber 14 is the enclosed space that fills with air when the inflatable paddle board 100 is inflated. By controlling the air pressure within the inflation chamber 14, the rigidity of the inflatable paddle board 100 can be adjusted to suit different water conditions and user preferences.

When fully inflated, the combination of the two body layers 11 and 12, the connecting threads 13, and the peripheral enclosing strip 20 ensures that the inflatable paddle board 100 retains its shape and provides a stable platform for paddling.

At the heart of the inflatable paddle board 100 lies the drop stitch fabric, a material pivotal to the structural integrity of the inflatable paddle board 100. The two body layers 11 and 12 are two parallel layers of woven material connected by the plurality of connecting threads 13 which can be polyester terylene fiber, nylon or aramid fiber. When the inflatable paddle board 100 is inflated, these connecting threads 13 hold the top and bottom surfaces together, maintaining a flat shape and allowing the inflatable paddle board 100 to achieve high internal pressure, resulting in a firm and stable platform.

The primary material enveloping the drop stitch core is typically polyvinyl chloride (PVC). Known for its durability and resistance to abrasions, PVC ensures that the inflatable paddle board 100 remains airtight and resilient against environmental factors. In some cases, thermoplastic polyurethane (TPU) is used as an alternative coating, offering similar airtight properties.

The peripheral enclosing strip 20 is typically mainly made of a strong and flexible material, such as PVC or TPU, providing resistance against air leakage, external impacts, and general wear and tear.

More specifically, as shown in FIGS. 8-12, the peripheral enclosing strip 20 of this embodiment comprises two surface layers 201 and a mesh layer 202 disposed between the two surface layers 201. Each of the two surface layers 201 can be made of PVC or TPU, the mesh layer 202 can be made of a fiber material such as polyester terylene fiber, nylon and aramid fiber. The mesh layer 202 comprises a plurality of first yarns 2021 and a plurality of second yarns 2022 which are vertical to each other and are connected to define a plurality of connecting nodes 2023, the two surface layers 201 are coated on two sides of the mesh layer 202. The first yarns 2021 and the second yarns 2022 can be respectively embodied as warp yarns and weft yarns, as an example, each warp yarn can be embodied to have a length larger than the weft yarn.

The fiber-reinforced mesh layer 202 increases tensile strength, preventing shape distortion when inflated. The PVC or TPU-coated surface layers 201 offer resistance to environmental stress, impacts, and abrasions, extending the board's lifespan. The double-layered coating structure ensures a tight seal, reducing the risk of air leakage over time. The warp and weft yarns 2021, 2022 in the mesh layer control expansion, ensuring a stable shape and firm surface when fully inflated.

In this embodiment, the peripheral enclosing strip 20 comprises a strip body 203 and two end portions 204, the strip body 203 is extended between the two end portions 204 while the two end portions 204 are bonded to each other so as to form a circular continual enclosing strip. The strip body 203 is integrally bonded on the edge 110 of the top body layer 11 and the edge 120 of the bottom body layer 12 by thermal bonding, so as to form a peripheral side wall of the inflatable paddle board 100 between the two end portions 204 of the peripheral enclosing strip 20. In this embodiment, no glue is required to bond the strip body 203 to the edge 110 of the top body layer 11 and the edge 120 of the bottom body layer 12. The strip body 203 comprises a main strip portion 2031 and two attaching portions 2032 respectively extended from two sides of the main strip portion 2031, the two attaching portions 2032 are respectively bonded on edge 110 of the top body layer 11 and the edge 120 of the bottom body layer 12 by thermal bonding.

Unlike glue which can make the bonded area stiff and prone to cracking, thermal bonding retains the natural flexibility of the materials. This improves impact resistance and reduces the likelihood of material fatigue. The thermal bonding process creates a seamless fusion, eliminating microscopic air gaps that might exist in adhesive-based bonding.

When used over time, glue dries out, cracks, or peels, leading to air leakage. Glue also can weaken under UV radiation and water exposure, reducing their sealing effectiveness. When the inflatable paddle board 100 operate under high internal pressure, and glue may gradually lose its grip, leading to delamination. This thermal bonding manner between the peripheral enclosing strip 20 and the main body 10 reduces the risk of air leakage, enhancing the long-term inflation stability of the inflatable paddle board 100.

Figure 22A:
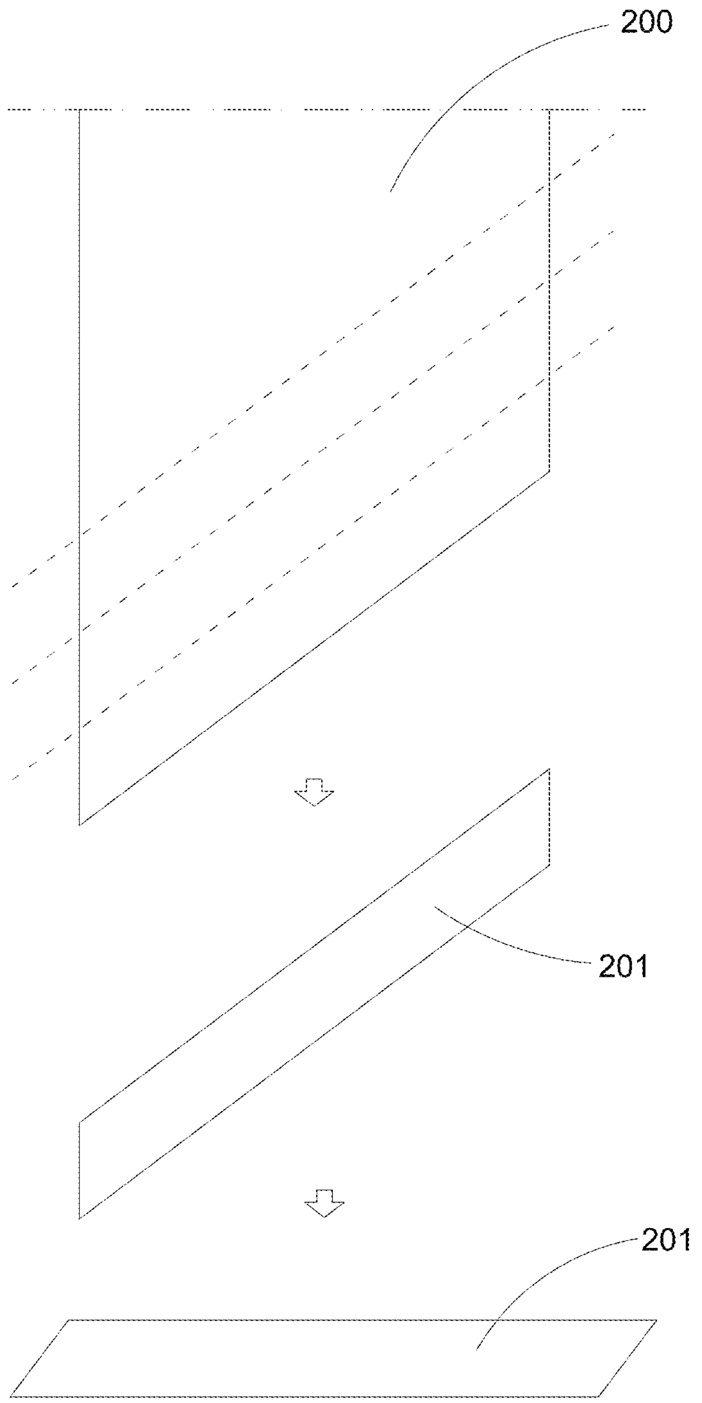
FIG. 22A is a schematic view illustrating a strip material being cut to form the strip part of the peripheral enclosing strip of the inflatable paddle board according to the above preferred embodiment of the present invention.
Figure 22B:
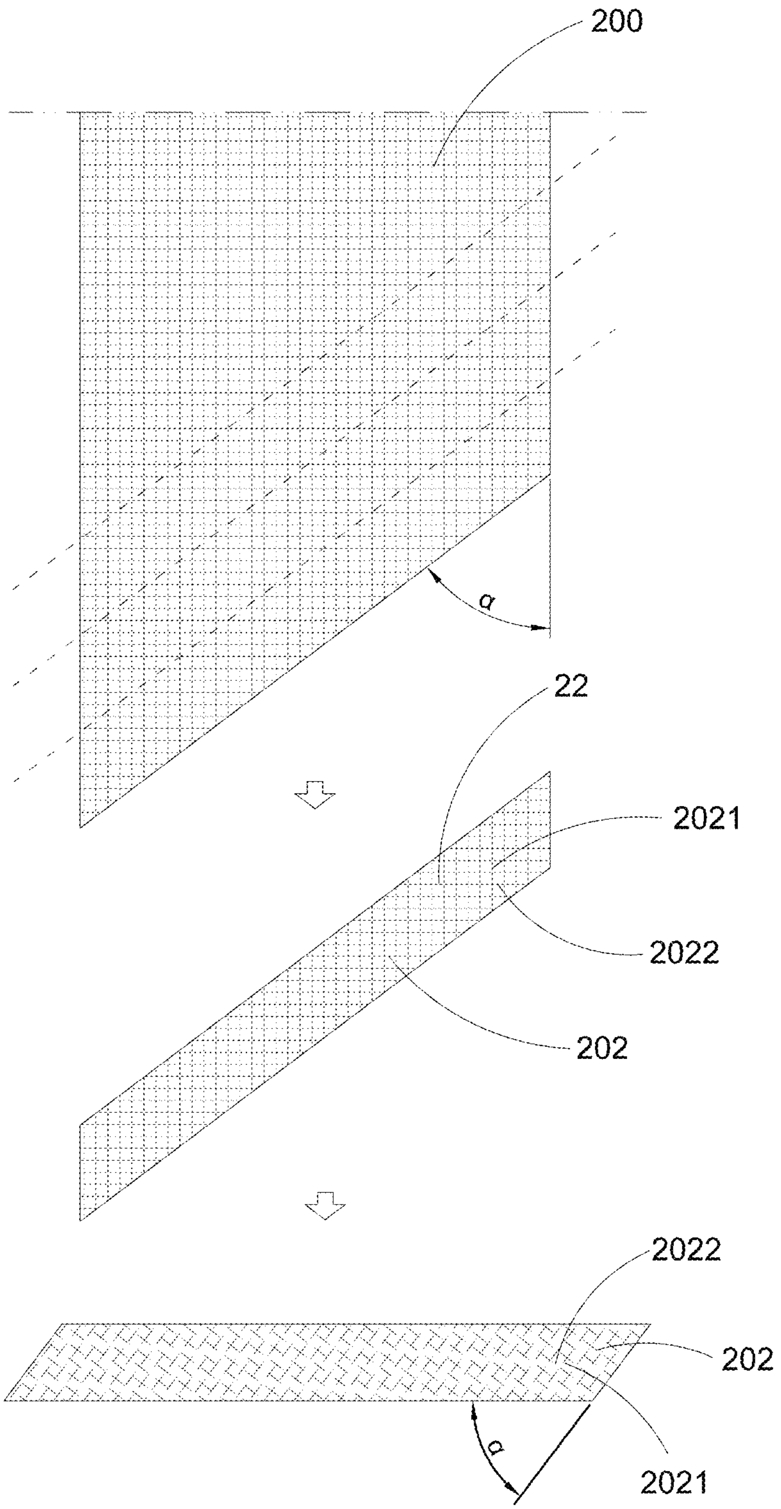
FIG. 22B is a schematic view illustrating the mesh layer of the strip part of the peripheral enclosing strip of the inflatable paddle board according to the above preferred embodiment of the present invention, wherein a top surface layer above the mesh layer is removed for showing the mesh layer of the obtained strip part.

Referring to FIG. 22A and FIG. 22B of the drawings, a strip material 200 is illustrated to comprise horizontal first yarns 2021 and vertical second yarns 2022 which are perpendicular to each other. The horizontal first yarns 2021 can be extended along a length direction of the strip material 200 while the vertical second yarns 2022 can be extended along a width direction of the strip material 200. When the material sheet for the peripheral enclosing strip 20 is cut off from the strip material 200, it is preferred in this embodiment that the cutting line is an inclined cutting line with respect to the horizontal first yarns 2021, but is not along the horizontal first yarns 2021. Advantages of inclined cutting are to prevent fraying, allow for different desired lengths, and provide elasticity and stretchability.

As shown in FIG. 22B of the drawings, the first yarns 2021 and the second yarns 2022 are respectively not extended in the length direction of the peripheral enclosing strip 20 and the width direction of the peripheral enclosing strip 20, so as to enhance stretchability along the length direction of the peripheral enclosing strip 20, so that the peripheral enclosing strip 20 is able to circumferentially wrapped around the edge 110 of the top body layer 11 and the edge 120 of the bottom body layer 12 by thermal bonding. An included angle $\alpha$ between the first yarns 2021 and the length direction of the peripheral enclosing strip 20 is 30°-60°, preferred 37°-53°, more preferred 45°.

In other words, when cut along the first yarns, the obtained peripheral enclosing strip 20 would have rigid fibers aligned along its length, limiting flexibility. Inclined cutting disrupts the rigid fiber alignment, increasing stretchability in the length direction. This stretchability allows the peripheral enclosing strip 20 to stretch and conform smoothly when wrapped around the edge 110 of the top body layer 11 and the edge 120 of the bottom body layer 12, the configuration also reduces stress concentration, preventing wrinkles, deformation, or misalignment in the wrapping process. With better stretchability, the peripheral enclosing strip 20 evenly conforms to the curved edges of the main body 10, ensuring a larger and more consistent contact surface for thermal bonding, so that a secure and airtight seam is formed, preventing air leakage and improving durability.

In addition, in a thermal bonding process, the peripheral enclosing strip 20 is sandwiched between parts of a thermal bonding device 410 of a system 400 for manufacturing the inflatable paddle board 100, pressing forces will act on the peripheral enclosing strip 20 at two sides thereof, the inclined fiber orientation absorbs and distributes stress more effectively, so as to prevent wrinkles and enhance better conformation to the contour of the main body 10.

Figure 10:
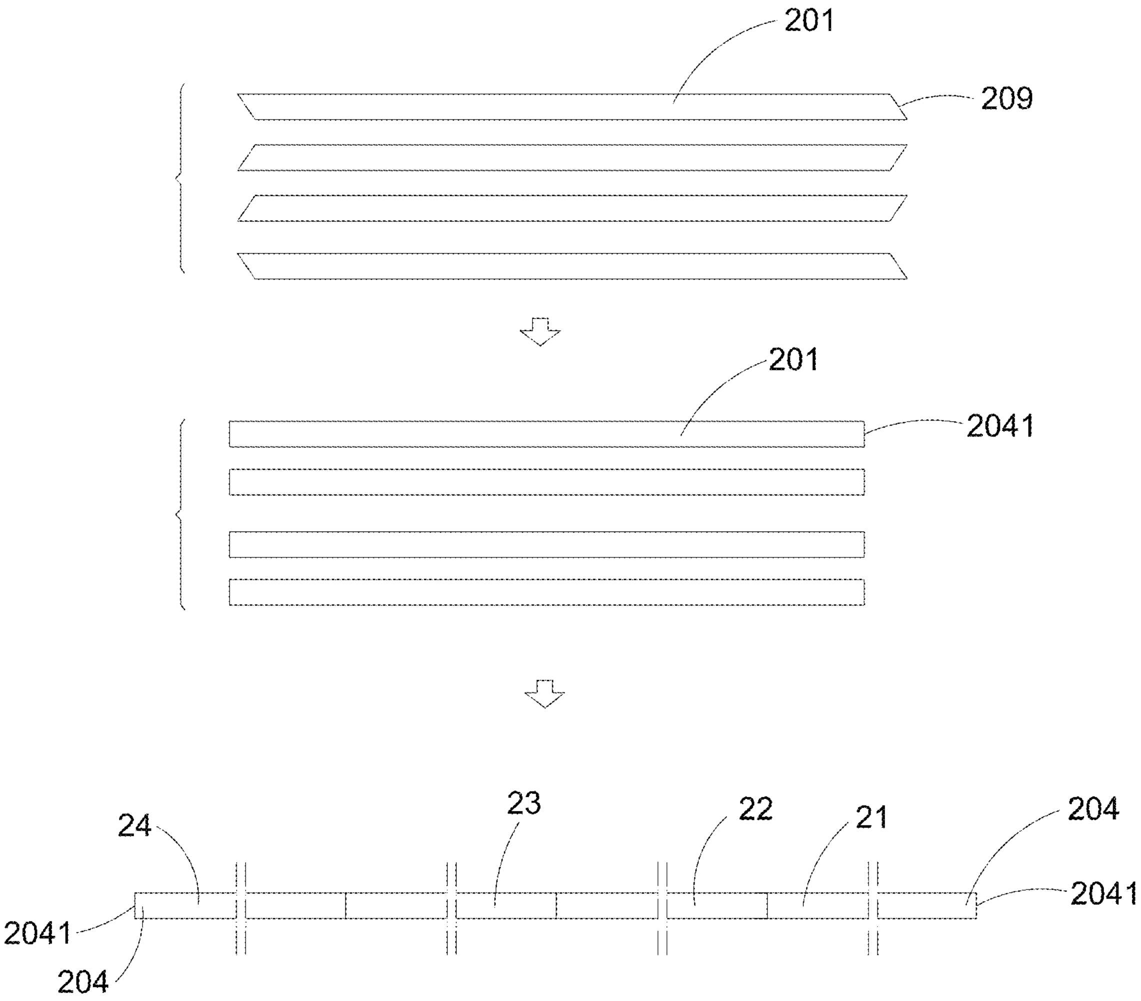
FIG. 10 is a schematic view illustrating four strip parts being connected to form the peripheral enclosing strip of the inflatable paddle board according to the above preferred embodiment of the present invention.
Figure 11:
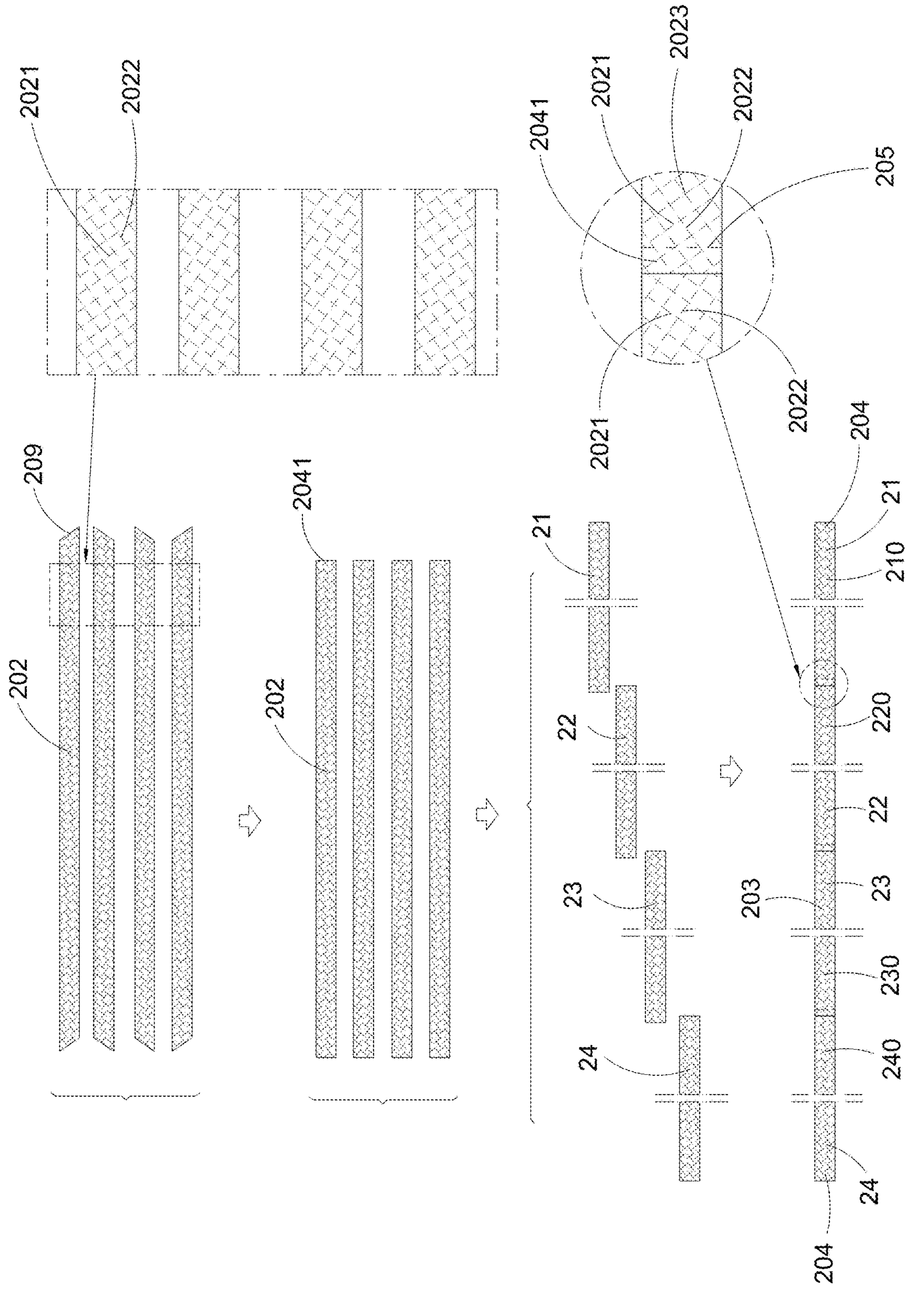
FIG. 11 is a schematic view illustrating yarn patterns of the strip parts of the peripheral enclosing strip of the inflatable paddle board according to the above preferred embodiment of the present invention, wherein a top surface layer above the mesh layer is removed for showing the mesh layer of each strip part.
Figure 12:
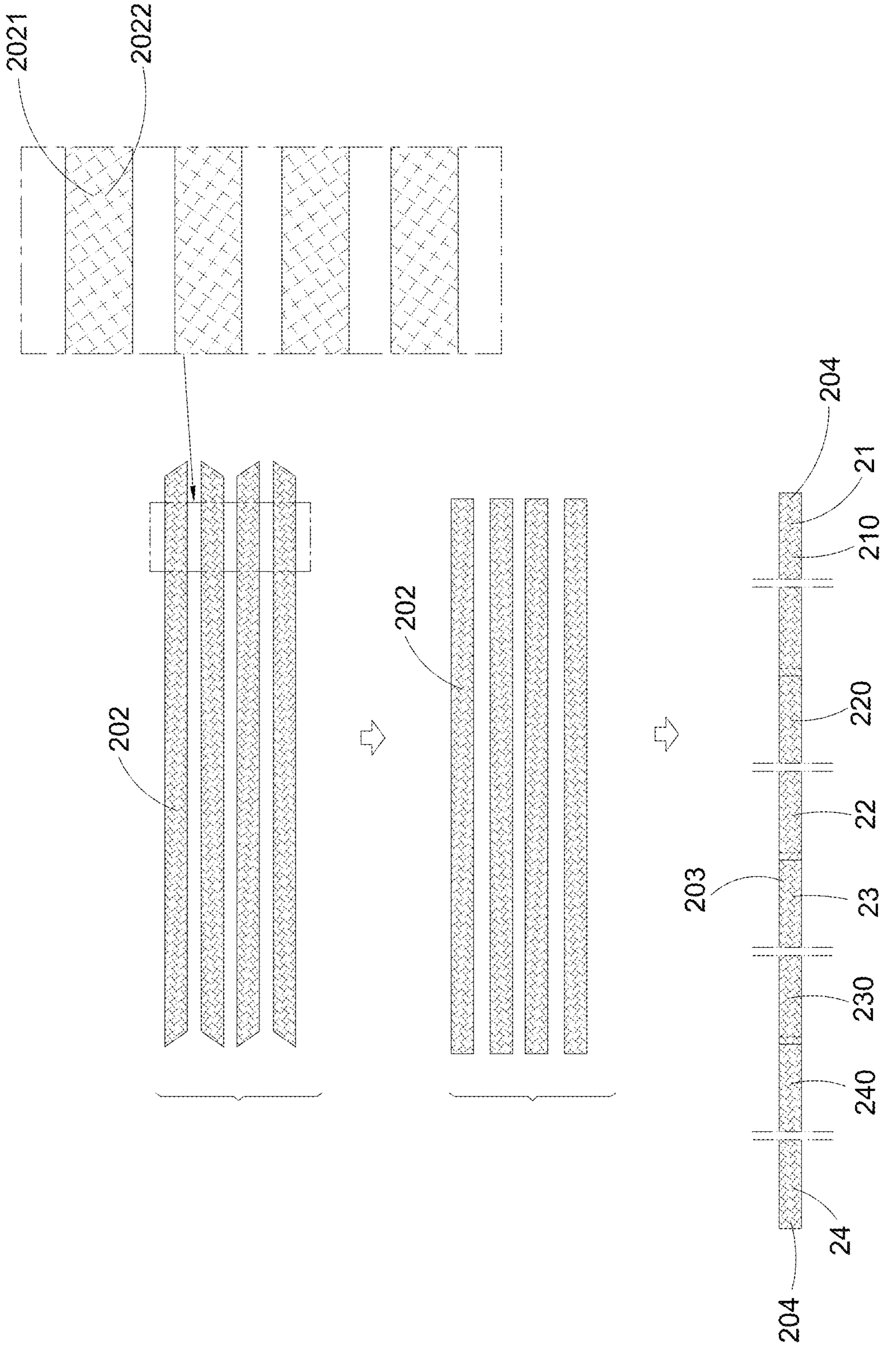
FIG. 12 is a schematic view illustrating alternative yarn patterns of the strip parts of the peripheral enclosing strip of the inflatable paddle board according to the above preferred embodiment of the present invention, wherein a top surface layer above the mesh layer is removed for showing the mesh layer of each strip part.

The peripheral enclosing strip 20 can be embodied as a single strip. As shown in FIG. 10 to FIG. 12 of the drawings, the peripheral enclosing strip 20 comprises a plurality of strip parts which are connected in an end-to-end manner to form a ring-shaped strip for coupling with the edge 110 of the top body layer 11 and the edge 120 of the bottom body layer 12 by thermal bonding.

More specifically, in this embodiment, the peripheral enclosing strip 20 comprises four strip parts which are a first strip part 21, a second strip part 22, a third strip part 23 and a fourth strip part 24. The four strip parts are integrated with each other to form the strip body 203, an end of the first strip part 21 and an end of the fourth strip part 24 are respectively the two end portions 204 of the peripheral enclosing strip 20 which are connected with each other after thermal bonding process.

The first strip part 21 is integrated with the second strip part 22 by a first connecting seam 205, the second strip part 22 is integrated with the third strip part 23 by the second connecting seam 206, the third strip part 23 and the fourth strip part 24 are integrated with each other by a third connecting seam 207, the fourth strip part 24 and the first strip part 21 are connected with each other by a fourth connecting seam 208. A length of each strip part can be 1 m-2.5 m, preferred 1.6 m-2.2 m, a width of each strip part can be 5 cm-25 cm, preferred 8 cm-13 cm, a thickness of each strip part can be 0.3 cm-1 cm, preferred 0.5 cm-0.7 cm. The width of the main strip portion 2031 of each strip part between edges of the main body 10 is shorter than a height of the connecting threads 13 which can be 15 cm, because that the connecting threads 13 between edges 110 and 120 of the two body layers are removed or cut off in the middle, the edges 110 and 120 of the two body layers can function as parts of the side wall of the inflatable paddle board 100. A width of each of the edge 110 of the top body layer 11 and the edge 120 of the bottom body layer 12 which are respectively bonded with the strip parts of the peripheral enclosing strip 20 is about 0.5 cm-3 cm, preferred 1.5 cm-2 cm.

As a typical example, a length of each strip part for a common inflatable paddle board 100 can be 1.8 m, a width of each strip part can be 8 cm, a thickness of each strip part can be 0.52 cm, a height of the connecting threads can be 15 cm.

In a conventional inflatable paddle board, a plurality of strip sections of the side enclosing strip are connected with each other by glues. However, the strip body 203 of the peripheral enclosing strip 20 formed by the four strip parts of the present invention are integrated with each other through thermal bonding, so as to form a glueless strip body 203. By eliminating glue, this design of the present invention ensures long-term airtightness without the risk of adhesive failure. Accordingly, at least the first connecting seam 205, the second connecting seam 206, and the third connecting seam 207 are formed by heating the material of the surface layers 201 in the thermal bonding process.

In other words, the conventional inflatable paddle boards rely on glue to join strip sections, but glue deteriorates due to aging, moisture and temperature fluctuations. Thermal bonding fuses materials at the molecular level, creating a seamless, airtight joint with no weak points, higher mechanical strength for preventing delamination and resistance to environmental stressors like water and heat. Glue application may result in uneven bonding, leading to micro-gaps where air can escape. Thermal bonding creates a uniform, continuous seal, preventing any air leakage. Without glue in the strip body 203, there is no risk of adhesive breakdown, ensuring the inflatable paddle board 100 remains airtight and durable for extended use.

In addition, after the strip body 203 is thermally bonded to the edge 110 of the top body layer 11 and the edge 120 of the bottom body layer 12, the left two end portions 204 can be laminated with each other and connected with each other. Preferably, the two end portions 204 can be laminated with each other by thermal bonding, so that no glue is required to bond all of the four strip pars of the entire peripheral enclosing strip 20. Alternatively, only the two end portions 204 of the peripheral enclosing strip 20 are glued with each other while the rest strip body 203 of the peripheral enclosing strip 20 is glueless. Since the glue is only applied between the two laminated end portions 204, there is also no glue applied between the peripheral enclosing strip 20 and the edge 110 of the top body layer 11 and the edge 120 of the bottom body layer 12, so that a uniform and continuous seal preventing any air leakage is also ensured. Accordingly, the fourth connecting seam 208 formed after the thermal bonding process can be a glue or can be formed by thermal bonding.

When the strip material 200 is inclined cut to provide the strip parts of the side sealing strip 20 of the present invention. In the present invention, two strip materials can be cut from the same strip material 200, one of the strip materials is flipped, so as to allow the two strip materials to provide the strip parts with different yarn patterns, such as the first strip part 21 and the second strip part 22. Alternatively, the inclined cutting lines on two different strip materials 200 are mirror cutting lines, so as to provide the strip parts with different yarn patterns.

The main body 10 of the inflatable paddle board comprises a head portion 101 and a tail portion 102, the first strip part 21 and the second strip part 22 are distributed at two sides of the head portion 101 while the third strip part 23 and the fourth strip part 24 are distributed at two sides of the tail portion 102. Each of the first strip part 21, the second strip part 22, the third strip part 23 and the fourth strip part 24 comprises the first yarns 2021 and the second yarns 2022 between two surface layers 201. The first yarns 2021 and the second yarns 2022 of the first strip part 21 define a first yarn pattern 210, the first yarns 2021 and the second yarns 2022 of the second strip part 22 define a second yarn pattern 220, the first yarns 2021 and the second yarns 2022 of the third strip part 23 define a third yarn pattern 230, the first yarns 2021 and the second yarns 2022 of the fourth strip part 24 define a fourth yarn pattern 240. As shown in FIGS. 11 and 12 of the drawings, the first yarn pattern 210 is different from the second yarn pattern 220, the third yarn pattern 230 is different from the fourth yarn pattern 240. The warp and weft yarns in different strip parts intersect at varied angles, allowing each part to conform better to curved or bent edges of the head or tail portion of the main body 10.

More specifically, both the first yarns 2021 and the second yarns 2022 of each strip part are inclined with respect to the length direction of the peripheral enclosing strip 20 along the peripheral edge of the main body 10. The first strip part 21 and the second strip part 22 wrapped around the head portion 101 of the main body 10 are not formed by a continual strip which is folded to provide two parts which are laminated on the head portion 101 of the main body 10.

The first yarns 2021 of the first strip part 21 are not parallel with the first yarns 2021 of the second strip part 22, but define an included angle thereof which can be an acute angle, the second yarns 2022 of the first strip part 21 are also not parallel with the second yarns 2022 of the second strip part 22, but define an included angle therebetween which can be an acute angle. The first yarns 2021 of the first strip part 21 and the first yarns 2021 of the second strip part 22 can be arranged in mirrored sloping lines, the second yarns 2022 of the first strip part 21 and the second yarns 2022 of the second strip part 22 can be arranged in mirrored sloping lines. In the mirrored sloping lines, one line slopes upward from left to right, while the other slope downward from left to right, creating a balanced and reflective geometric appearance.

The mirrored sloping lines can be symmetrical or not symmetrical. Preferably, the first yarn pattern 210 of the first strip part 21 is symmetrical to the second yarn pattern 220 of the second strip part 22, the first yarns 2021 of the first strip part 21 are symmetrical with the first yarns 2021 of the second strip part 22 on two sides of the first connecting seam 205 between the first strip part 21 and the second strip part 22.

During thermal bonding, unlike a continual strip which will result in that the stress will distribute along a bending edge 1011 of the head portion 101 of the main body 10 to produce wrinkles and weak bonding, the first strip part 21 and the second strip part 22 of this embodiment of the present invention will conform to the bending edge 1011 of the head portion 101 of the main body 10.

The third strip part 23 and the fourth strip part 24 wrapped around the tail portion 102 of the main body 10 are not formed by a continual strip which is folded to provide two parts which are laminated on the tail portion 102 of the main body 10. The first yarns 2021 of the third strip part 23 are not parallel with the first yarns 2021 of the fourth strip part 24, but define an included angle thereof which can be an acute angle. The second yarns 2022 of the third strip part 23 are also not parallel with the second yarns 2022 of the fourth strip part 24, but define an included angle therebetween which can be an acute angle. The first yarns 2021 of the third strip part 23 and the first yarns 2021 of the fourth strip part 24 can be arranged in mirrored sloping lines, the second yarns 2022 of the third strip part 23 and the second yarns 2022 of the fourth strip part 24 can be arranged in mirrored sloping lines. In the mirrored sloping lines, one line slopes upward from left to right, while the other slope downward in the same manner, creating a balanced and reflective geometric appearance.

Preferably, the third yarn pattern 230 of the third strip part 23 is symmetrical to the fourth yarn pattern 240 of the fourth strip part 24, the first yarns 2021 of the third strip part 23 are symmetrical with the first yarns 2021 of the fourth strip part 24 on two sides of a third connecting seam 207 between the third strip part 23 and the fourth strip part 24.

As shown in FIGS. 11 and 12, the first strip part 21 and the fourth strip part 24 may have a same yarn pattern or different yarn patterns, the second strip part 22 and the third strip part 23 may have a same yarn pattern or different yarn patterns.

During thermal bonding, unlike a continual strip which will result in that the stress will distribute along a bending edge 1021 of the tail portion 102 of the main body 10 to produce wrinkles and weak bonding, the third strip part 23 and the fourth strip part 24 of this embodiment of the present invention will conform to the bending edge 1021 of the tail portion 102 of the main body 10.

In a conventional glued bonded inflatable paddle board, the side enclosing strip can be manually adjusted by the operator, so as to make the side enclosing strip to conform to the edge of the board. In the present invention, a thermal bonding device 410 is employed for the bonding between the peripheral enclosing strip 20 and the main body 10. The thermal bonding device 410 can only rotate mechanically and cannot adjust the left-right balance of the peripheral enclosing strip 20 on the main body 10. The alignment strip parts are pre-set to be relatively balanced on both sides. More specifically, the first strip part 21 and the second strip part 22 are pre-set on the two sides of the head portion 101 of the main body 10 with different yarn patterns, the third strip part 23 and the fourth strip part 23 are pre-set on the two sides of the tail portion 102 of the main body 10 with different yarn patterns.

By configuring the arrangement of the strip parts, the system compensates for the mechanical limitations of the thermal bonding device 410, maintaining an even and secure bond along the entire board edge without requiring manual adjustments.

Figure 6:
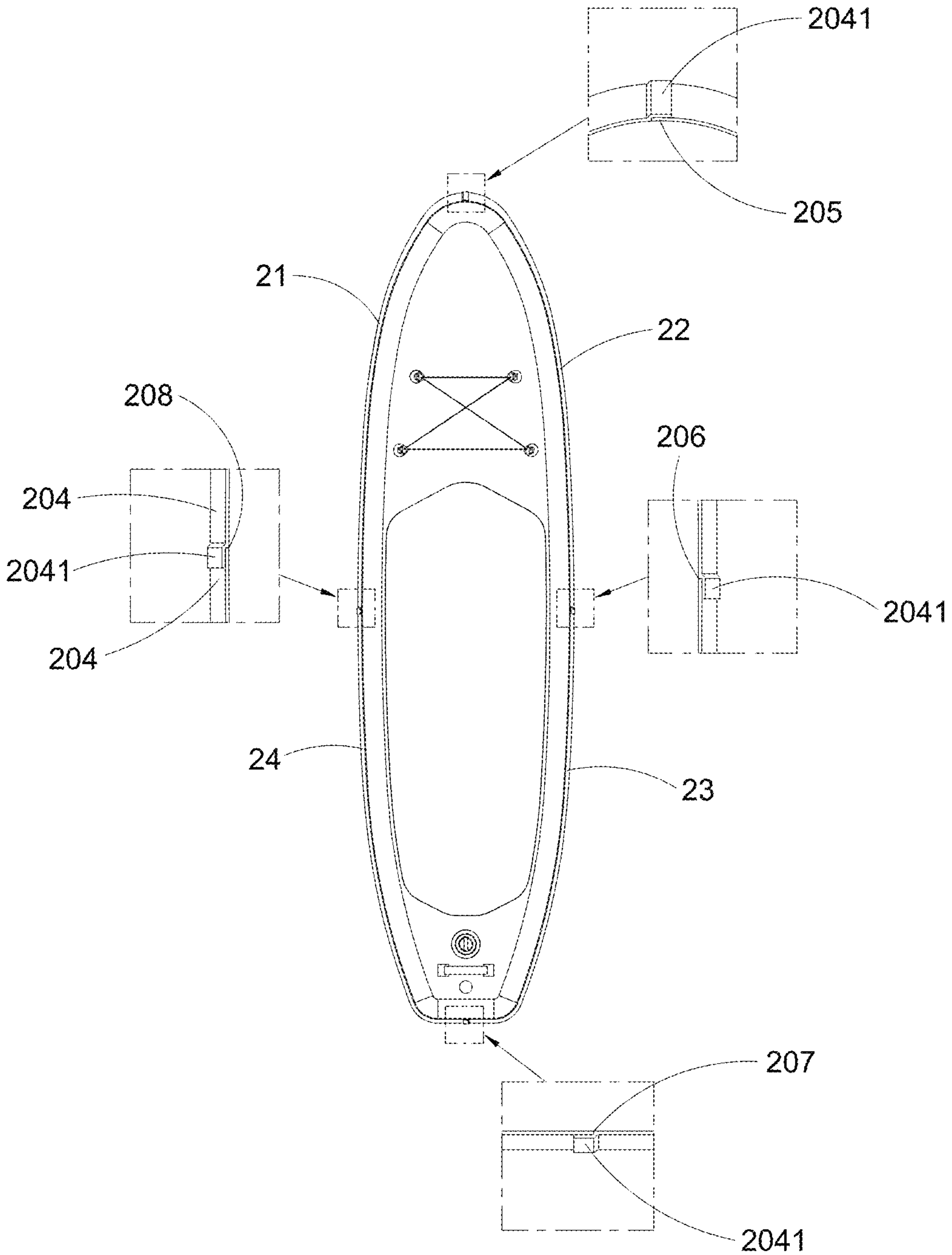
FIG. 6 is a schematic view illustrating a plurality of strip parts of the peripheral enclosing strip of the inflatable paddle board according to the above preferred embodiment of the present invention.
Figure 7:
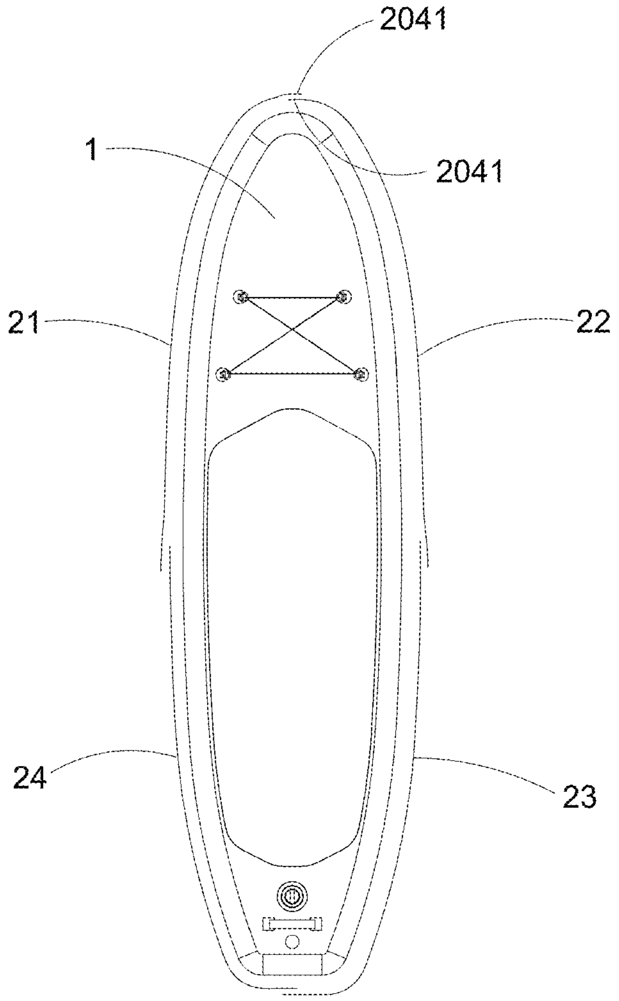
FIG. 7 is a schematic view illustrating a layering pattern between end edges of adjacent strip parts of the plurality of strip parts of the peripheral enclosing strip of the inflatable paddle board according to the above preferred embodiment of the present invention.
Figure 8:
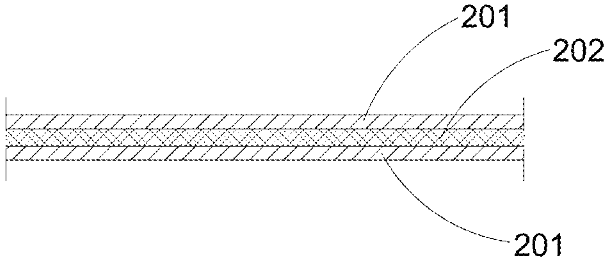
FIG. 8 is a sectional view illustrating the peripheral enclosing strip of the inflatable paddle board according to the above preferred embodiment of the present invention.
Figure 9:
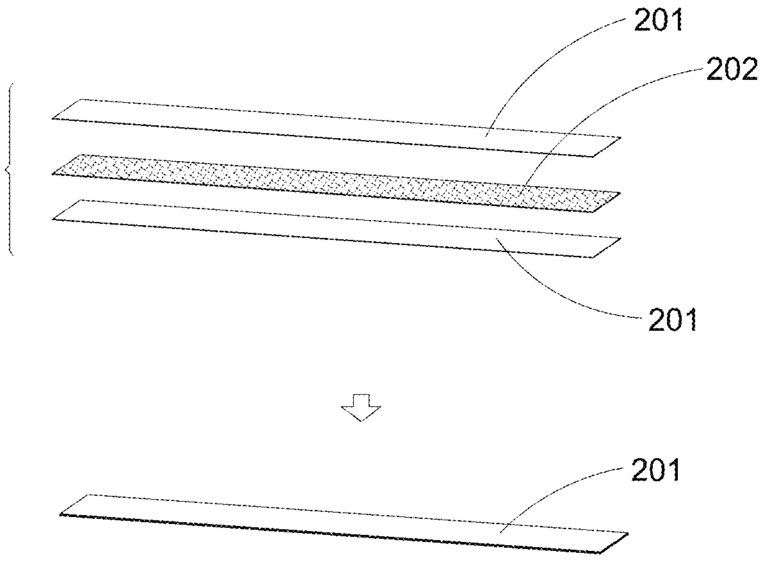
FIG. 9 is a schematic view illustrating the stacking of two surface layers and a mesh layer of the peripheral enclosing strip of the inflatable paddle board according to the above preferred embodiment of the present invention.

As shown in FIGS. 6 and 7, it is worth mentioning that the first connecting seam 205 is preferred to be positioned at a center of the bending edge 1011 of the head portion 101, the third connecting seam 207 is preferred to be positioned at a center of the bending edge 1021 of the tail portion 102. Alternatively, the first connecting seam 205 may be positioned away from the center of the bending edge 1011 of the head portion 101 with an allowable deviation within 10 cm, the third connecting seam 207 may be positioned away from the center of the bending edge 1021 of the tail portion 102 with an allowable deviation within 10 cm. Each of the second connecting seam 206 and the fourth connecting seam 208 is respectively preferred to be positioned at a central area of the side edge of the main body 10. Specially, each of the second connecting seam 206 and the fourth connecting seam 208 can be away from the center of the side edge of the main body 10 with an allowable deviation within 10 cm.

As shown in FIGS. 10 to 12 of the drawings, when the strip part of the peripheral enclosing strip 20 is cut off from the strip material 200, the strip part of the peripheral enclosing strip 20 is provided with two end edges 209 which are inclined edges. The end portions with the inclined edges 209 are then cut off so as to provide the strip part with two vertical end edges 2041, so that two strip parts with vertical end edges 2041 are easy to be aligned and overlapped with each other for thermal bonding.

In the present invention, the four strip parts of the peripheral enclosing strip 20 are preheated and fused together using high-frequency waves, between the two end portions 204 which are bonded after the thermal bonding process, along a clockwise or counterclockwise direction, the end edge 2041 of each preceding strip part is positioned below the end edge 2041 of the next strip part, or the end edge 2041 of each preceding strip part is positioned above the end edge 2041 of the next strip part, so to ensure a consistent layering pattern, the tensile forces across the enclosing strip remain evenly distributed, reducing the risk of localized weak points. This proper end edge positioning ensures that thermal bonding device 410 operates smoothly without material jams, improving manufacturing efficiency.

Figure 13:
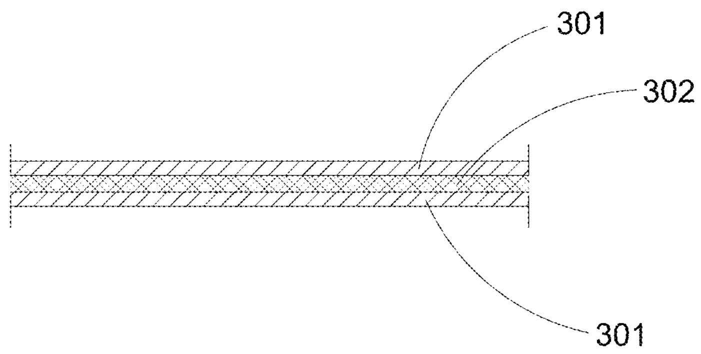
FIG. 13 is a sectional view illustrating the decoration strip of the inflatable paddle board according to the above preferred embodiment of the present invention.
Figure 14:
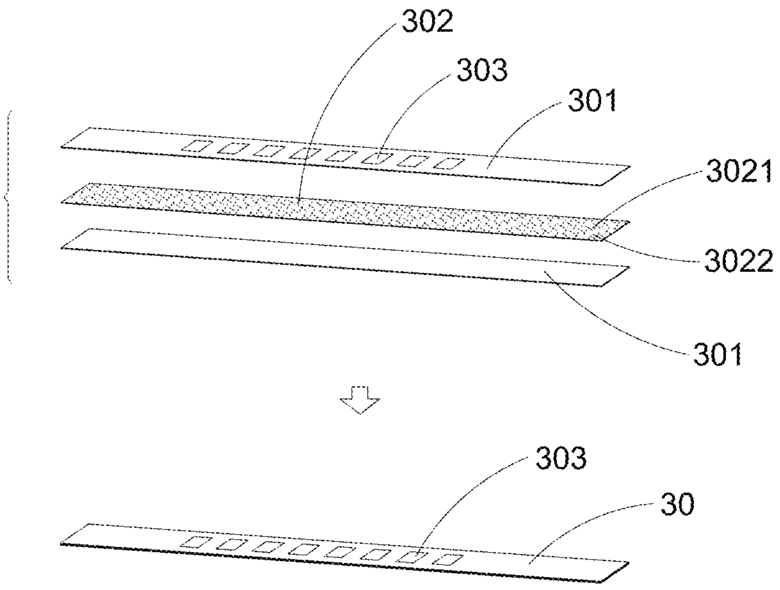
FIG. 14 is a schematic view illustrating the stacking of two surface layers and a mesh layer of the decoration strip of the inflatable paddle board according to the above preferred embodiment of the present invention.
Figure 15:
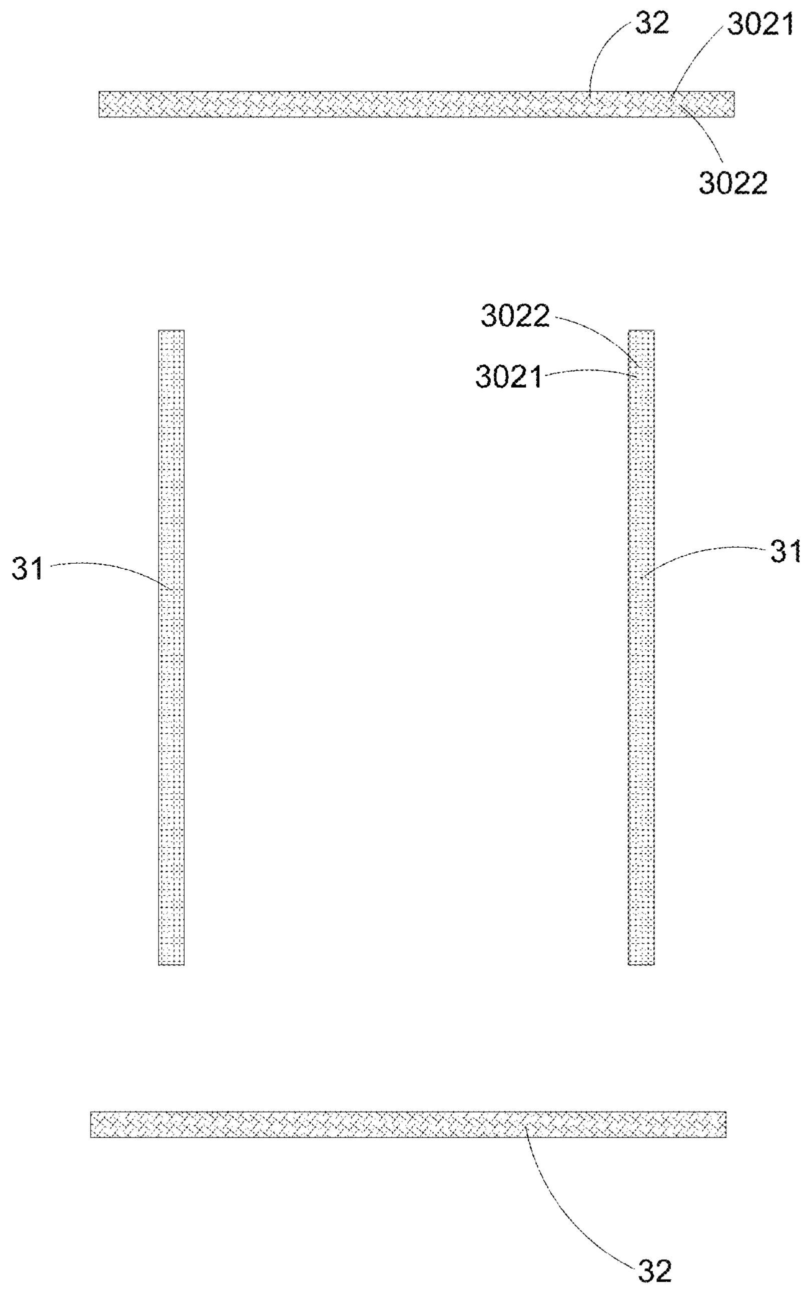
FIG. 15 is a schematic view illustrating the strip parts of the decoration strip of the inflatable paddle board according to the above preferred embodiment of the present invention, wherein a top surface layer above the mesh layer is removed for showing the mesh layer of each strip part.
Figure 16:
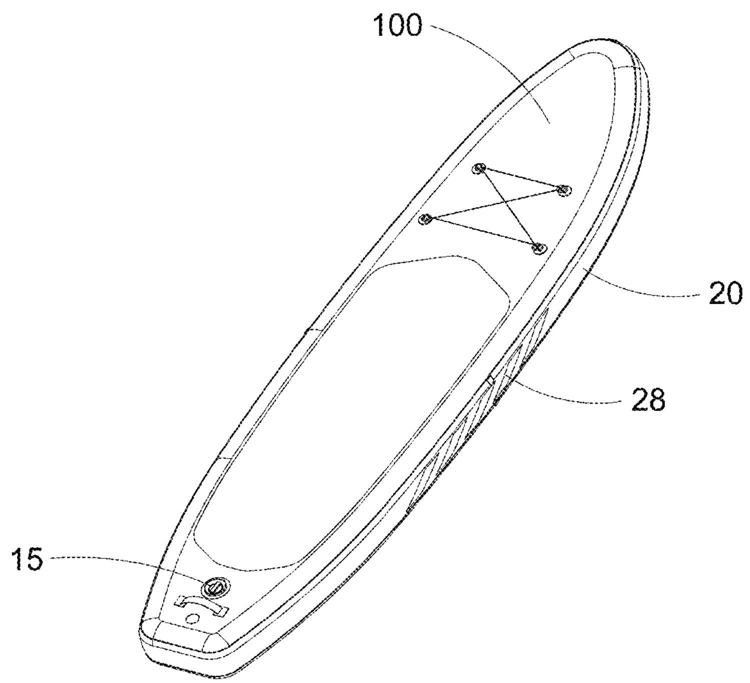
FIG. 16 is a perspective view of an inflatable paddle board according to an alternative mode of the above preferred embodiment of the present invention.
Figure 17:
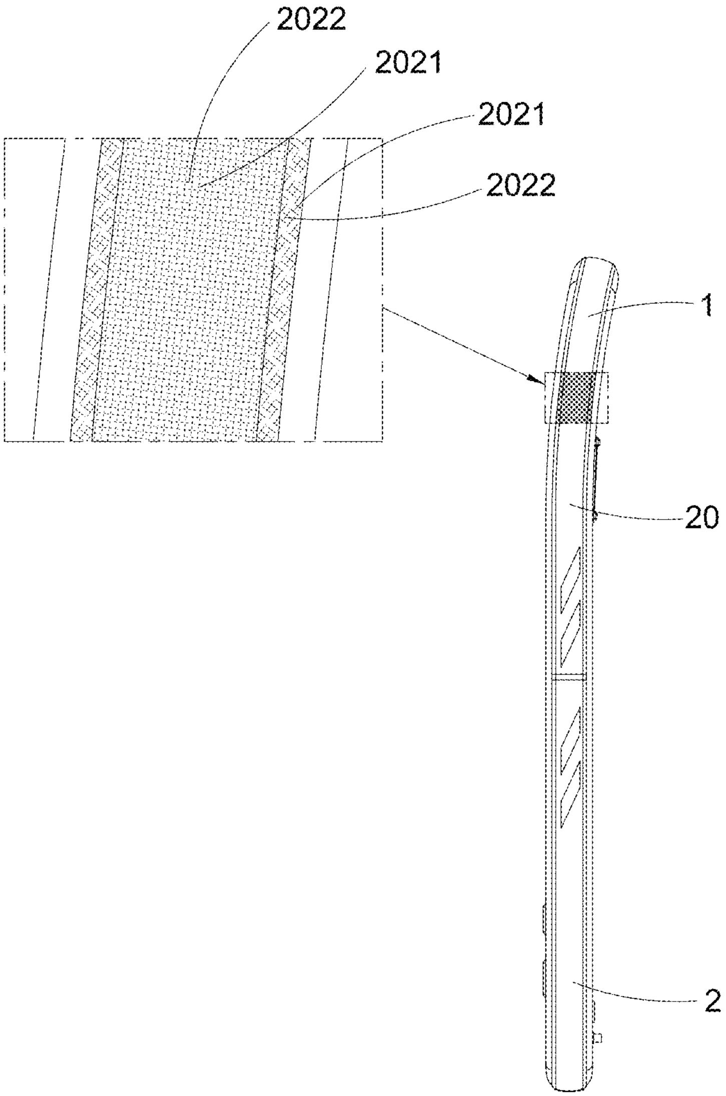
FIG. 17 is a sectional view of the inflatable paddle board according to the alternative mode of the above preferred embodiment of the present invention.
Figure 18A:
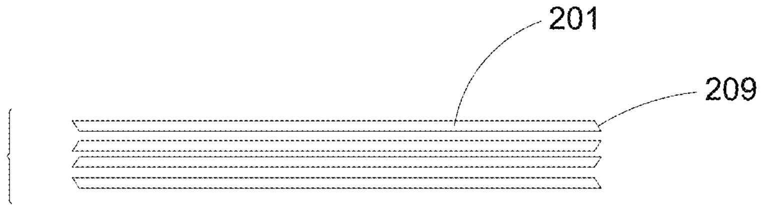
FIGS. 18A, 18B and 18C are schematic views illustrating four strip parts being connected to form an upper strip or lower strip of the peripheral enclosing strip of the inflatable paddle board according to the above alternative mode of the above preferred embodiment of the present invention.
Figure 18B:
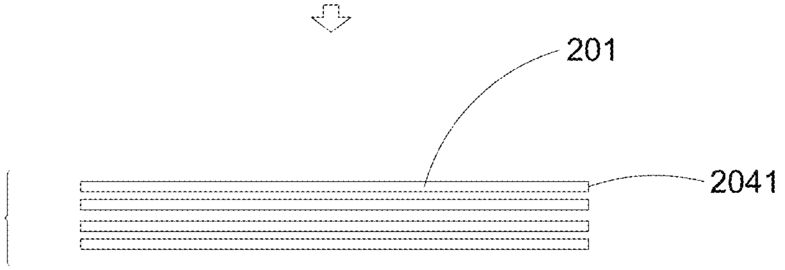
Figure 18C:
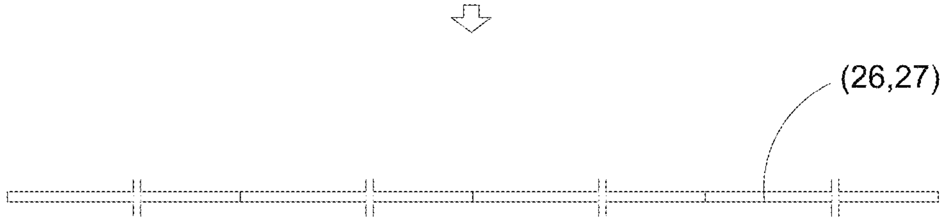
Figure 19A:
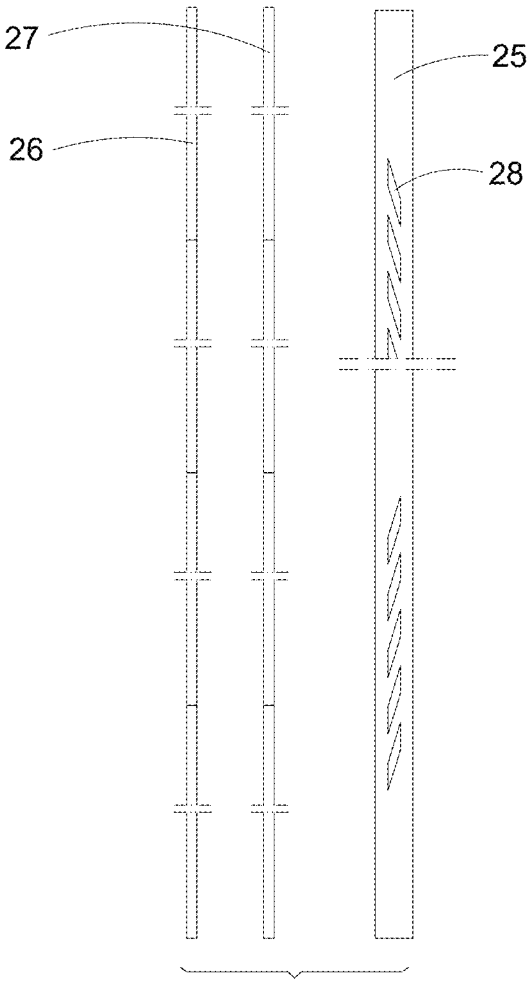
FIGS. 19A and 19B are schematic views illustrating a middle strip, an upper strip and a lower strip being connected to form the peripheral enclosing strip of the inflatable paddle board according to the above alternative mode of the above preferred embodiment of the present invention.
Figure 19B:
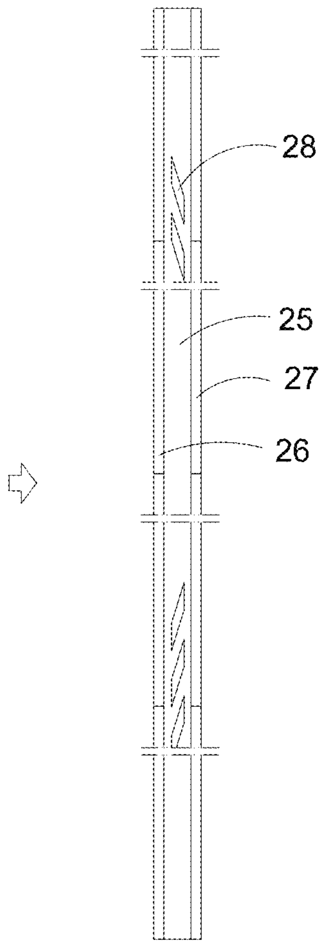
Figure 20A:
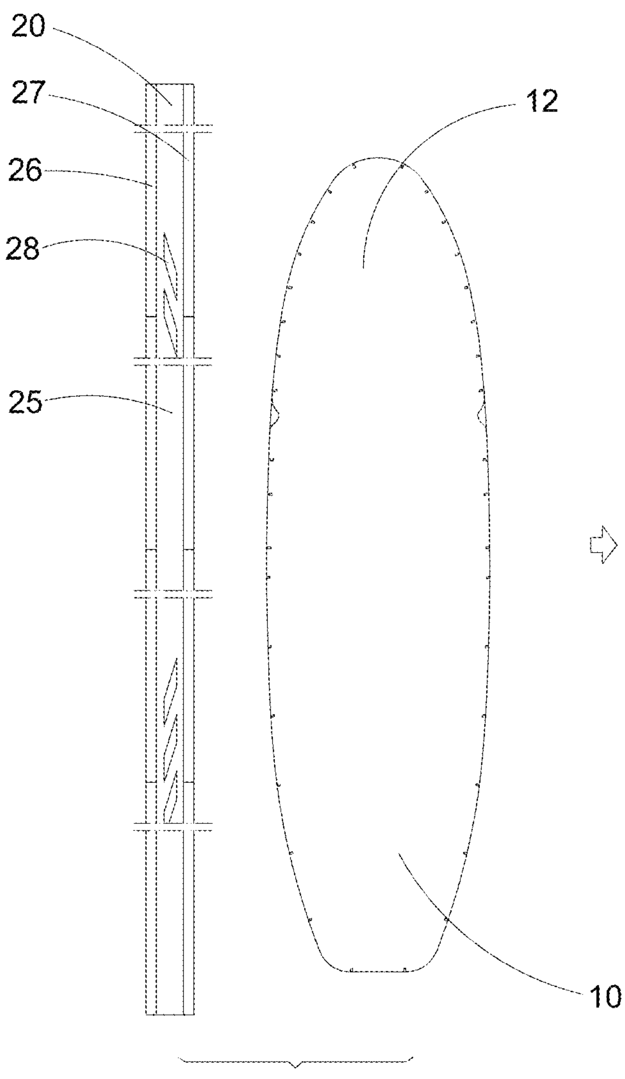
FIGS. 20A and 20B are schematic views illustrating the peripheral enclosing strip being bonded to a main body of the inflatable paddle board according to the above alternative mode of the above preferred embodiment of the present invention.
Figure 20B:
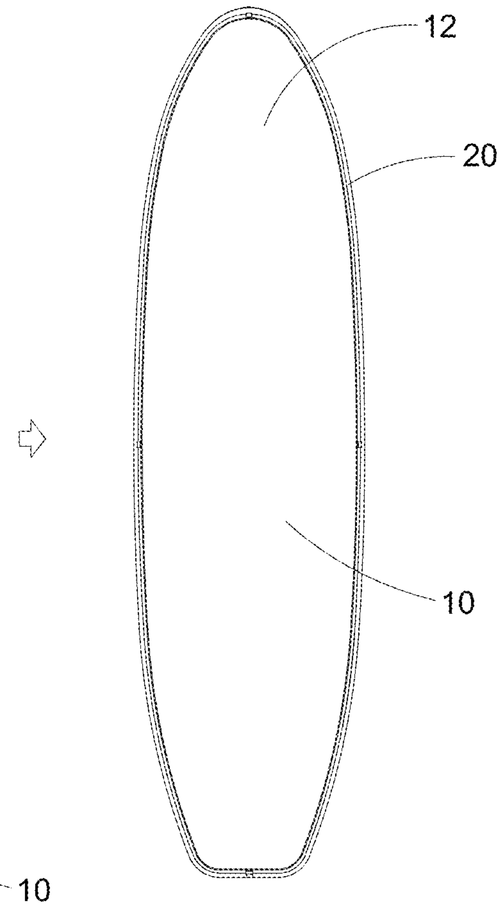

In addition, as shown in FIGS. 13 to 15, the inflatable paddle board 100 may further comprise a decoration strip 30 which comprises two surface layers 301, a mesh layer 302 and a decoration pattern 303 painted on an outer surface layer of the two surface layers 301. The two surface layers 301 can be made of a same material as the two surface layers 201 of the peripheral enclosing strip 20, the mesh layer 302, which can be made of a same material as the mesh layer 202 of the peripheral enclosing strip 20, comprises first yarns 3021 and second yarns 3022. A weight density of the mesh layer 302 of the decoration strip 30 can be larger than a weight density of the mesh layer 202 of the peripheral enclosing strip 20. As an example, the mesh layer 302 of the decoration strip 30 can have a density of 1000 D (Denier), the mesh layer 202 of the peripheral enclosing strip 20 can have a density of 500 D. The stretchability and elasticity of the decoration strip 30 is thus reduced, but the rigidity and the strength of the decoration strip 30 is enhanced.

The decoration pattern enables custom branding and personalization, making the paddle board visually distinctive. It enhances product marketability by allowing brands to feature logos, color patterns, or promotional graphics. The decoration strip 30, which can have a thickness larger than the peripheral enclosing strip 20, also strengthens the peripheral enclosing strip 20, reinforcing the sidewalls of the inflatable paddle board 100. The mesh layer 302 improves tear resistance, preventing damage from external forces. By using the same materials as the peripheral enclosing strip 20, the decoration strip blends seamlessly into the structure of the inflatable paddle board 100, ensuring uniform performance without affecting flexibility.

In this embodiment, the decoration strip 30 can be glued to the peripheral enclosing strip 20, can be embodied as a single strip or comprises a plurality of strip parts that are connected to each other. As an example, the decoration strip 30 may comprise four strip parts including two side strip parts 31 and two end strip parts 32, the first yarns 3021 and the second yarns 3022 of each side strip part 31 can be inclined yarns, or the first yarns 3021 are horizontal yarns and the second yarns 3022 are vertical yarns. The first yarns 3021 and the second yarns 3022 of each end strip part 32 are inclined yarns, so as to conform to the contour of the bending edge of the main body 10.

Figure 21:
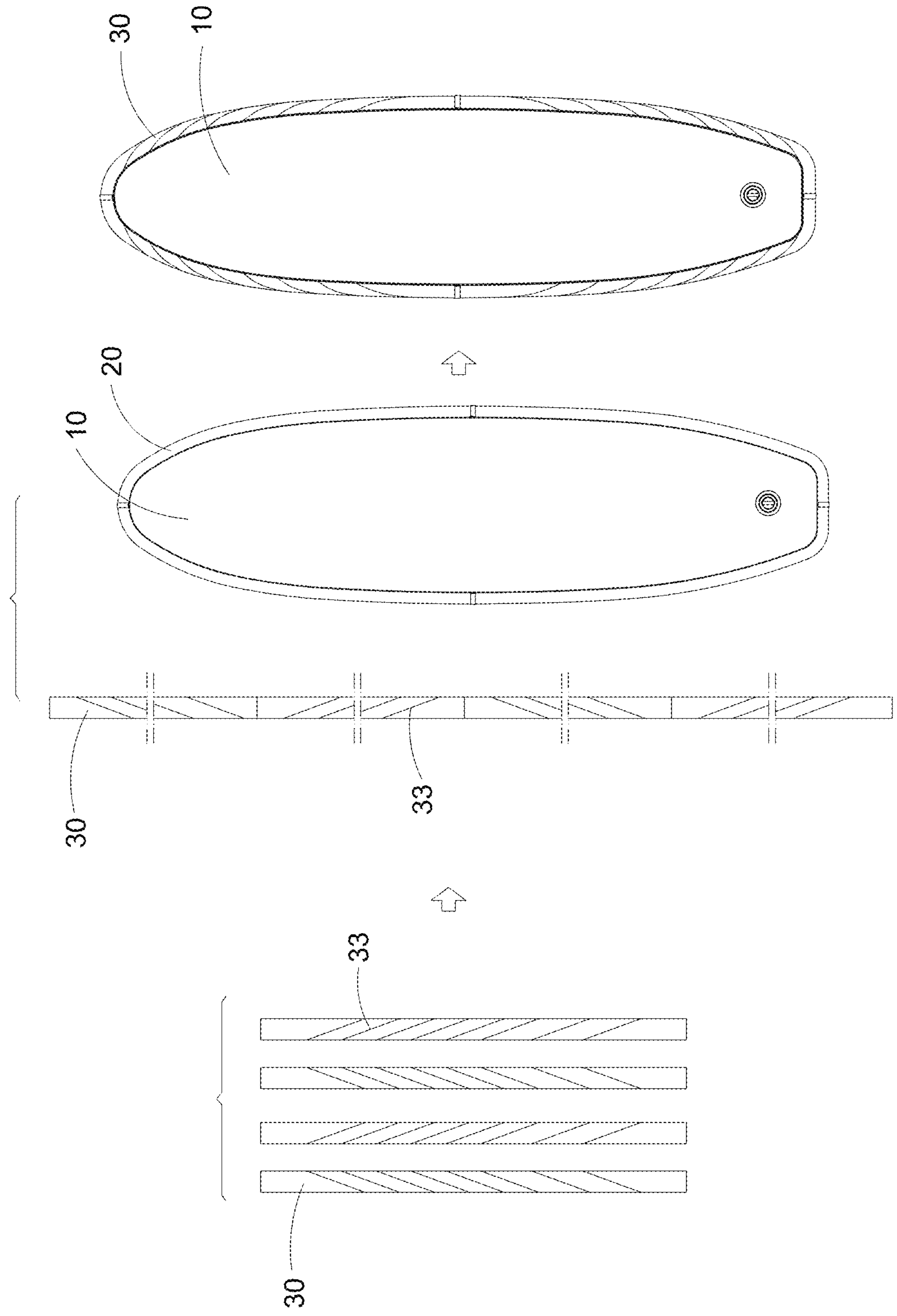
FIG. 21 is a schematic view illustrating an alternative decoration strip of the inflatable paddle board according to the above preferred embodiment of the present invention.

Referring to FIG. 21 of the drawings, the decoration strip 30 can be embodied to comprise four decoration strip parts 33, two decoration strip parts 33 can be provided at two opposite sides of the head portion 101 of the main body 10, while the other two decoration strip parts 33 can be provided at two opposite sides of the tail portion 102 of the main body 10. The two decoration strip parts 33 provided at two opposite sides of the head portion 102 of the main body 10 can have inclined yarns and may have different yarn patterns, such as mirror patterns. The two decoration strip parts 33 provided at two opposite sides of the tail portion 102 of the main body 10 can have inclined yarns and may have different yarn patterns, such as mirror patterns.

Alternatively, the peripheral enclosing strip 20 is omitted, and the decoration strip 30 with the four decoration strip parts 33 has a larger thickness than the peripheral enclosing strip 20 can can be employed to wrap the edges of the main body 10.

Referring to FIGS. 16 to 20B of the drawings, according to an alternative mode, the peripheral enclosing strip 20 comprises a middle strip 25, an upper strip 26 and a lower strip 27, the upper strip 26 is integrated on an upper edge of the middle strip 25, the lower strip 27 is integrated on a lower edge of the middle strip 25. In this embodiment, the peripheral enclosing strip 20 can be thicker than the peripheral enclosing strip 20 of the above embodiment and can be functioning as a decoration strip with is provided with a decoration pattern 28.

In this embodiment, the middle strip 25 can be embodied as a continual integral strip with horizontal first yarns 2021 and vertical second yarns 2022, there is no need to inclinedly cut the strip material 200 for obtaining the middle strip 25. Alternatively, the middle strip 25 comprises inclined first yarns 2021 and inclined second yarns 2022. Each of the upper strip 26 and the lower strip 27 can be embodied to comprise a mesh layer 202 with inclined first yarns 2021 and second yarns 2022. In addition, each of the upper strip 26 and the lower strip 27 can be embodied to comprise a plurality of strip parts, such as four strip parts, two adjacent strip parts with different yarn patterns, like the four strip parts 21, 22, 23, and 24 of the peripheral enclosing strip 20 of the above embodiment.

The employment of the upper strip 26 and the lower strip 27 with the inclined first yarns 2021 and inclined second yarns 2022 will allow the peripheral enclosing strip 20 to conform to the contour of the edge of the main body 10. Alternatively, the middle strip 25 also can be embodied to comprise a plurality of strip parts, such as the above four strip parts 21, 22, 23 and 24 which are connected to each other.

As a typical example, the length of the peripheral enclosing strip 20 for a common inflatable paddle board 100 can be 2 m, the width of the peripheral enclosing strip 20 can be 11 cm, the thickness of each strip part can be 0.7 cm, the height of the connecting threads can be 15 cm.

Accordingly, the middle strip 25 serves as a reinforced base layer, ensuring stability and durability while preventing deformation. The upper and lower strips 26 and 27 provide additional support while maintaining flexibility. The inclined warp and weft yarns of the upper and lower strips enhance stretchability, enabling the peripheral enclosing strip 20 to wrap smoothly around the curved edge of the main body of the inflatable paddle board. This prevents wrinkles, uneven tension, or stress concentrations, improving the aerodynamic and hydrodynamic properties of the paddle board.

It is worth mentioning that the inflatable paddle board 100 in an inflated state will comprise a raised head 1, also known as a rockered nose, which serves several functional purposes, primarily improving performance, stability, and usability in different water conditions. The raised head 1 helps the board ride over waves instead of cutting straight through them, reducing water resistance and preventing the nose from getting submerged. It improves control and maneuverability, especially in rough waters. A slightly lifted nose reduces the amount of water that directly contacts the front of the board, minimizing drag and allowing smoother movement. This is particularly beneficial for touring and racing paddle boards, helping them move efficiently over long distances.

In this embodiment, the raised head 1 is formed by the head portion 101 of the main body 10 and the part of the peripheral enclosing strip 20 bonded on the head portion 101, the top body layer 11 of the rest part 2 of the inflatable paddle board 100 has a horizontal top surface when the inflatable paddle board 100 has been inflated. The head portion 101 of the main body 10 is a portion with the bending edge 1011 and the head portion 101 comprises a top head layer 1012 and a bottom head layer 1013, the length L1 of the top head layer 1012 is smaller than the length L2 of the bottom head layer 1013, and the top head layer 1012 and the bottom head layer 1013 are bonded to the first strip part 21 and the second strip part 22 of the peripheral enclosing strip 20 by thermal bonding, so that after the inflatable paddle board 100 is inflated, the raised head 1 is formed because of the length difference of the top head layer 1012 and the bottom head layer 1013.

Figure 2:
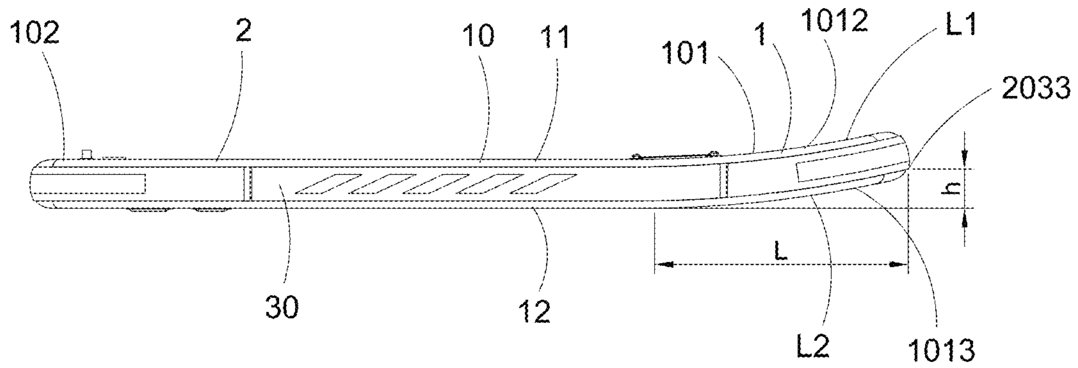
FIG. 2 is a side view of the inflatable paddle board according to the above preferred embodiment of the present invention.
Figure 3A:
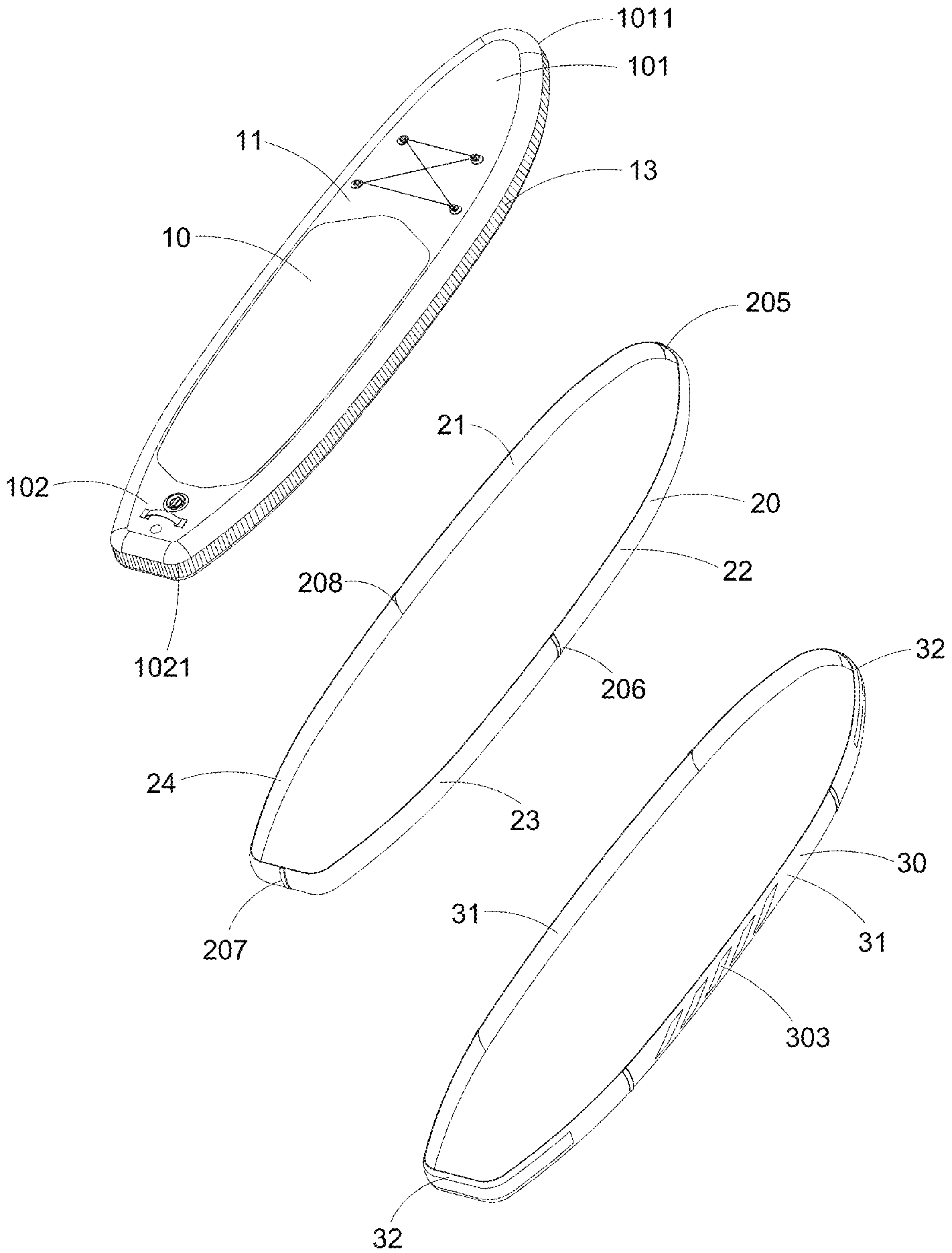
FIG. 3A is an exploded view of the inflatable paddle board according to the above preferred embodiment of the present invention.
Figure 3B:
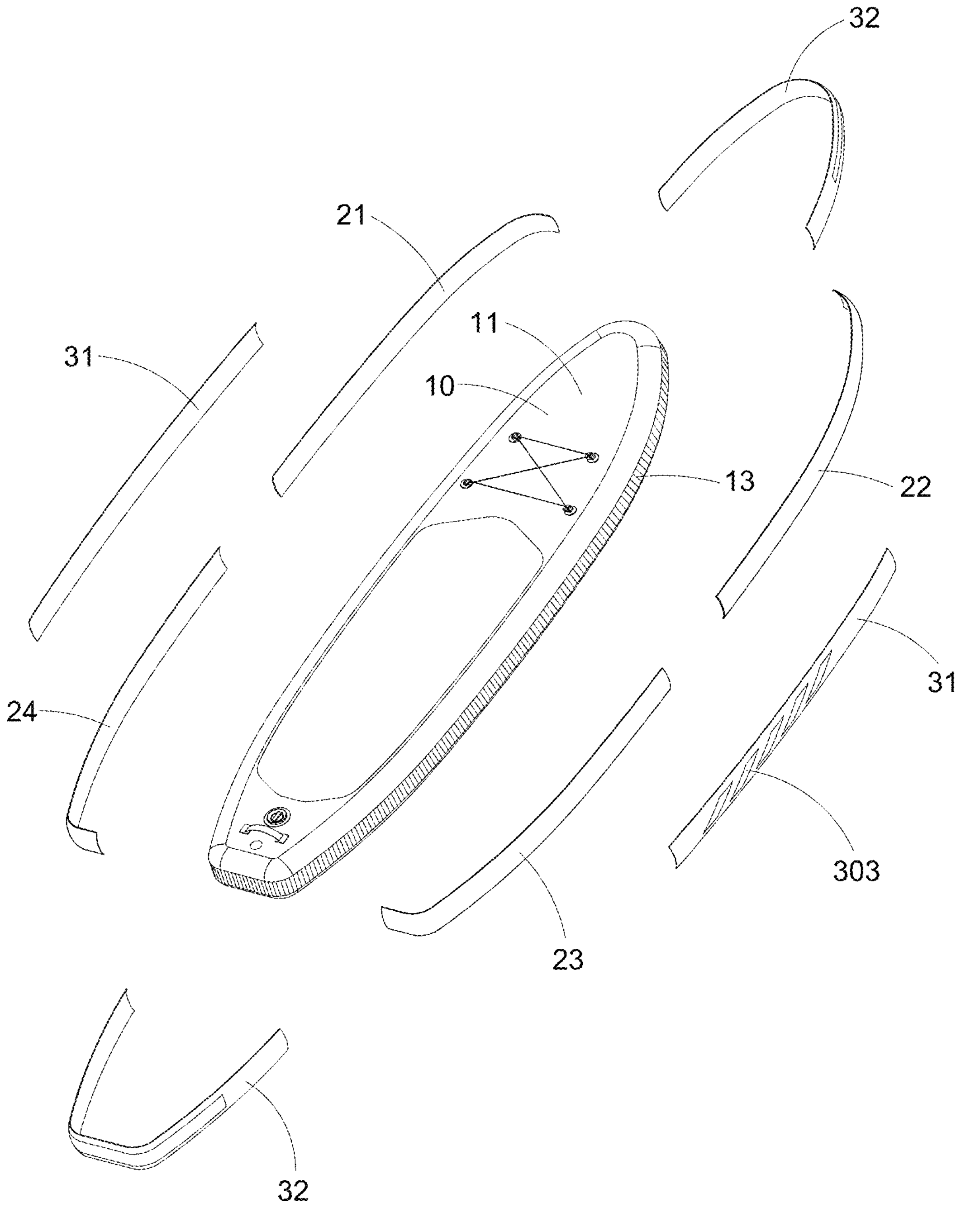
FIG. 3B is a further exploded view illustrating a peripheral enclosing strip and a decoration strip of the inflatable paddle board according to the above preferred embodiment of the present invention.
Figure 4A:
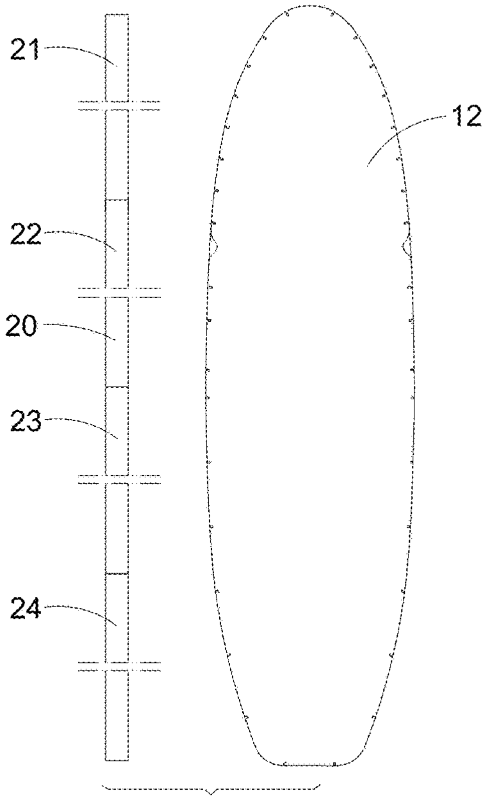
FIGS. 4A, 4B, 4C and 4D are schematic views illustrating a manufacturing process of the inflatable paddle board according to the above preferred embodiment of the present invention.
Figure 4B:
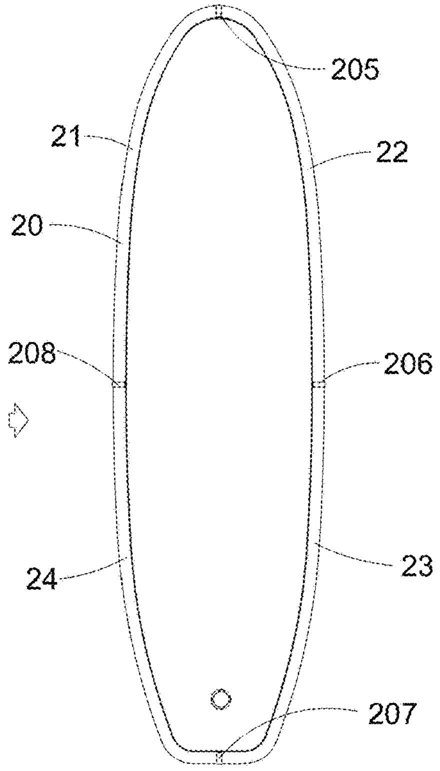
Figure 4D:
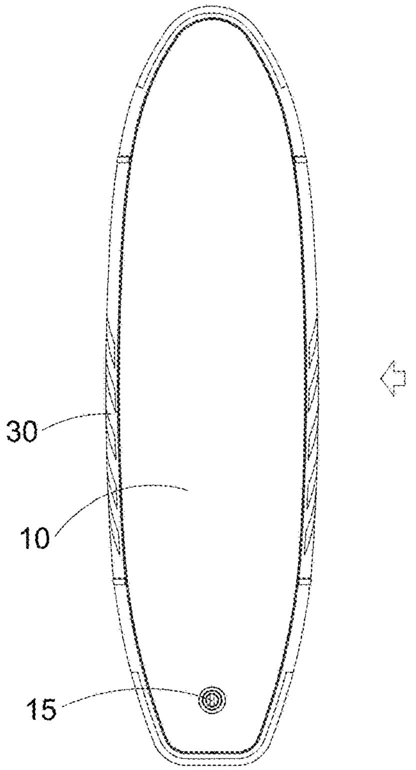
Figure 4C:
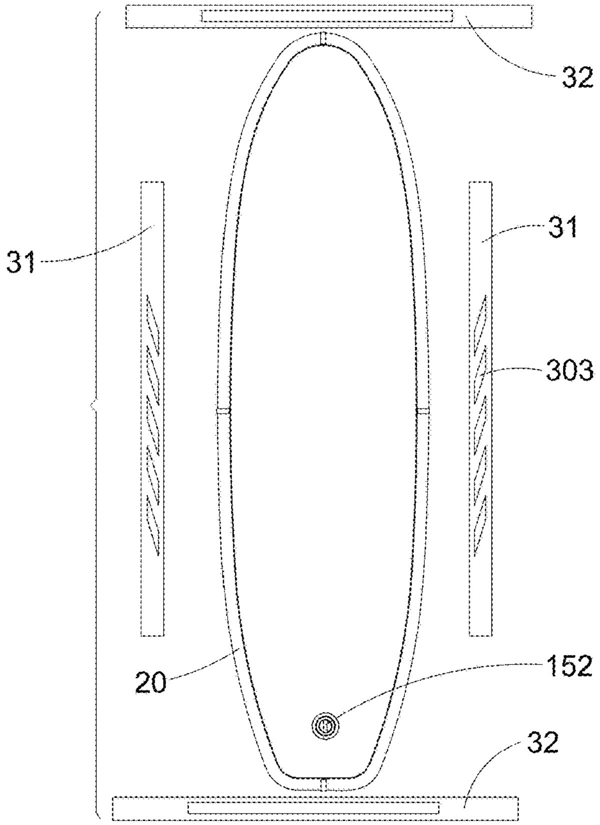
Figure 5A:
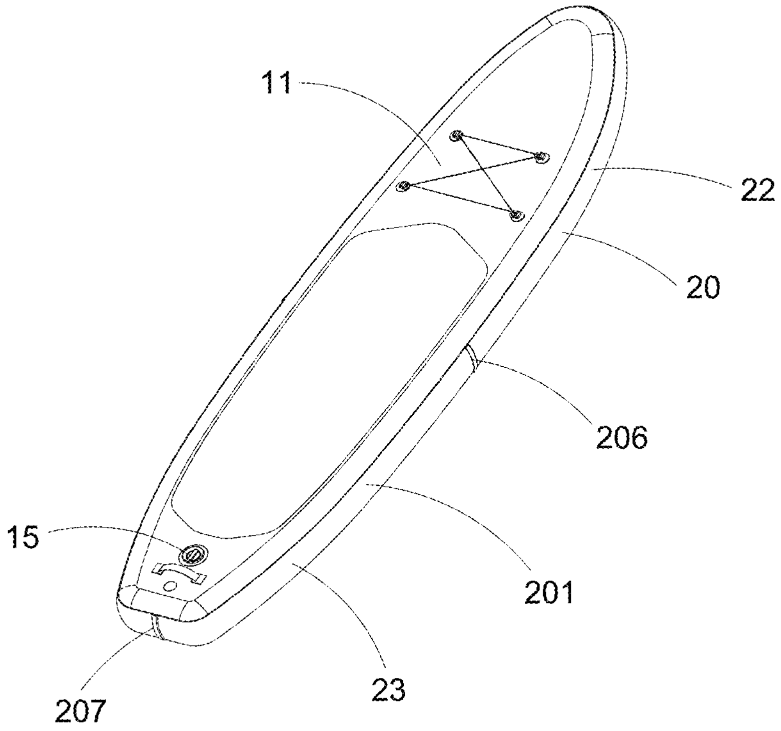
FIG. 5A is a perspective view of the inflatable paddle board according to the above preferred embodiment of the present invention, wherein the decoration strip has not been attached to the peripheral enclosing strip.
Figure 5B:
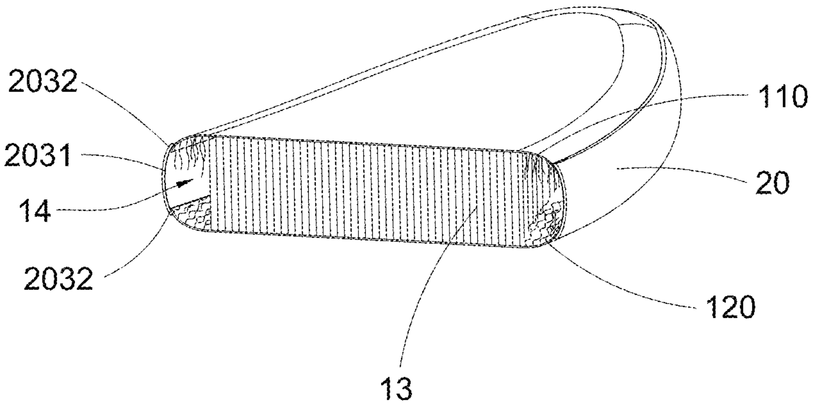
FIG. 5B is a cross-sectional view of the inflatable paddle board in FIG. 5A.

As shown in FIG. 2, a length L of the raised head 1, which will be curvedly extended above the environment surface when the inflatable paddle board 100 is inflated, is about 60 cm-120 cm, a height h of the raised head 1 is defined as a distance between a bottom edge 2033 of the strip body 203 of the peripheral enclosing strip 20 and a bottom horizontal surface of the inflatable paddle board 100 and is about 3 cm-20 cm, preferred 5-15 cm.

Alternatively, when there is no length difference between the top body layer 11 and the bottom body layer 12, the raised head 1 is not formed in the inflatable paddle board 100.

Referring to FIGS. 23 to 34 of the drawings, a system 400 for manufacturing the inflatable paddle board 100 of the present invention is illustrated. More specifically, the system 400 comprises the thermal bonding device 410 for bonding the peripheral enclosing strip 20 to the edge 110 of the top body layer 11 and the edge 120 of the bottom body layer 12, a fixing arrangement 420 for aligning the two body layers of the main body 10 and temporarily fixing the two body layers of the main body 10, and a cutting arrangement 430 for cutting the strip material 200 to obtain the strip parts of the peripheral enclosing strip 20, a bonding arrangement 440 for connecting the strip parts of the peripheral enclosing strip 20 to obtain the peripheral enclosing strip 20, and an end coupling arrangement 450 for integrating the two end portions 204 of the peripheral enclosing strip 20 after the thermal bonding process.

Figure 23:
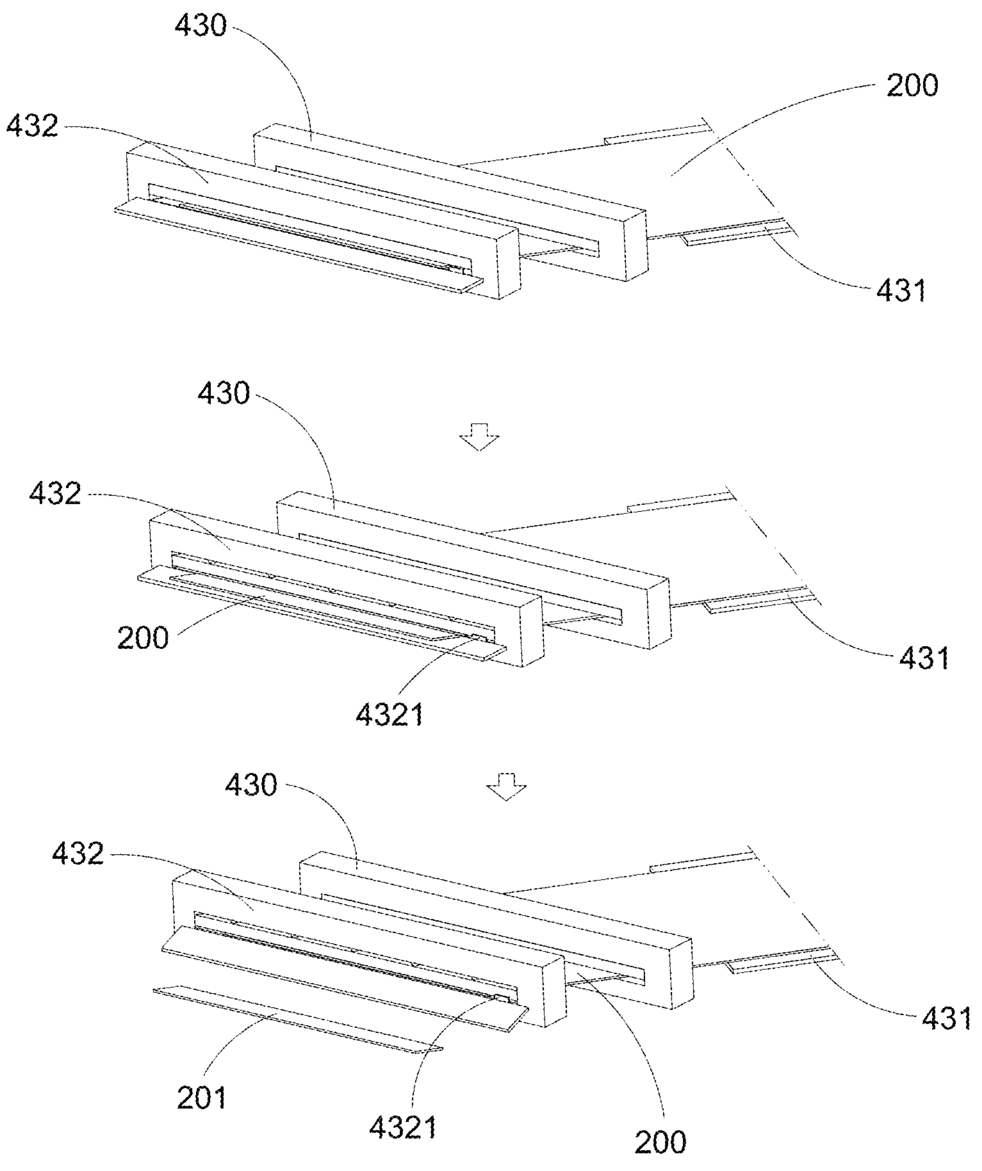
FIG. 23 is a schematic view illustrating a cutting arrangement for cutting the strip material for obtaining the strip part of the peripheral enclosing strip of the inflatable paddle board according to the above preferred embodiment of the present invention.

As shown in FIG. 23 of the drawings, the cutting arrangement 430 comprises a conveyor platform 431 for conveying the strip material 200, a cutting assembly 432 which comprises a cutting blade 4321 for inclinedly cutting the strip parts of the peripheral enclosing strip 20 from the strip material 200. The strip material 200 comprises horizontal first yarns 2021 and vertical second yarns 2022. The cutting blade 4321 is inclinedly arranged to cut the strip parts from the strip material 200, so that the obtained strip part of the peripheral enclosing strip 20 comprises inclined first yarns 2021 and inclined second yarns 2022.

Before the strip parts are integrated to form an integral strip, the end portions with the inclined edges 209 are cut off so as to provide the strip part with two vertical end edges 2041 which facilitate the alignment between the connecting ends of the two adjacent strip parts. In addition, other suitable cutting device can be employed to provide the strip parts with the vertical end edges 2041. Alternatively, the strip material 200 is manually cut to provide the strip parts with the vertical end edges 2041.

Figure 24A:
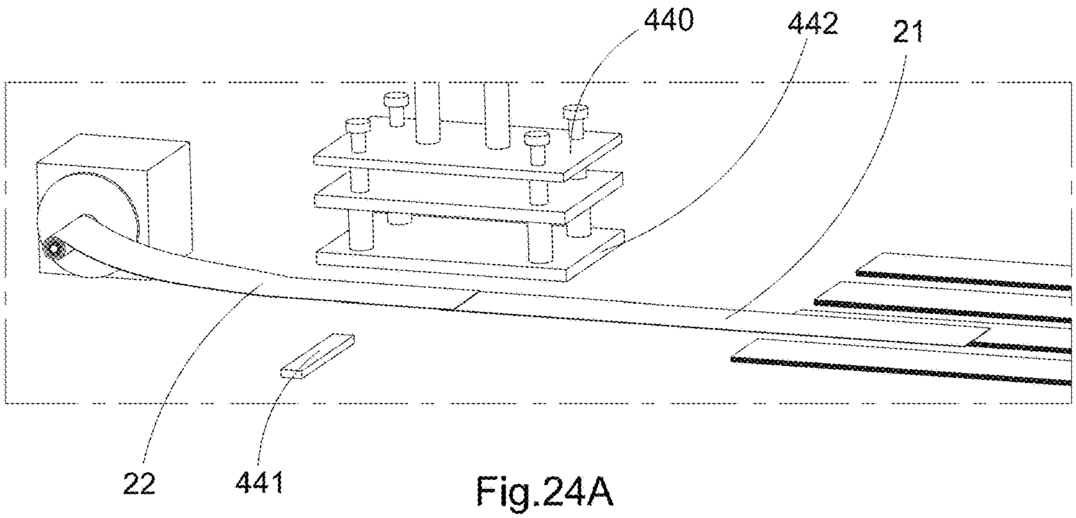
FIGS. 24A, 24B and 24C are perspective views illustrating a bonding arrangement for connecting the strip parts of the peripheral enclosing strip of the inflatable paddle board according to the above preferred embodiment of the present invention.
Figure 24B:
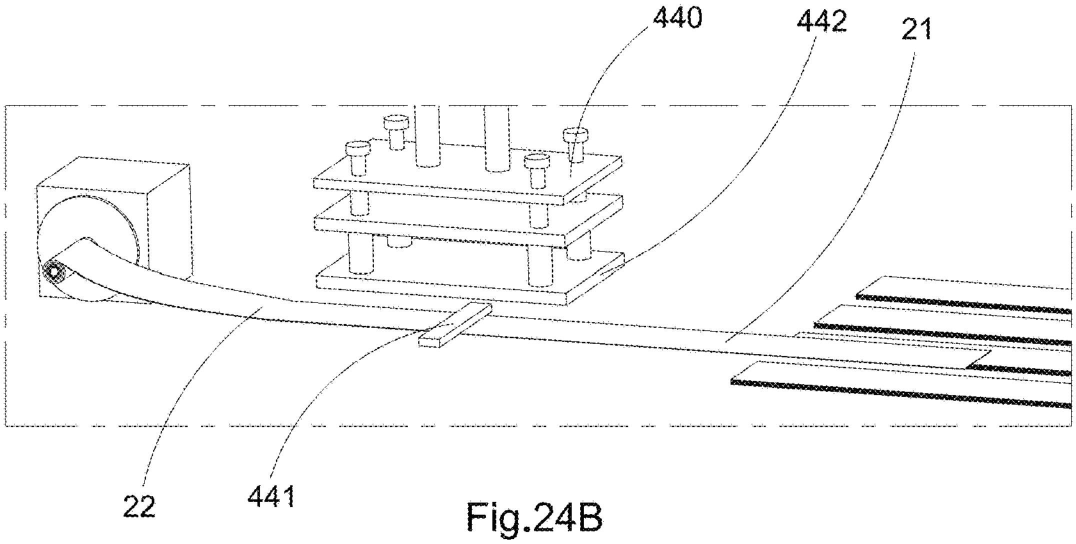
Figure 24C:
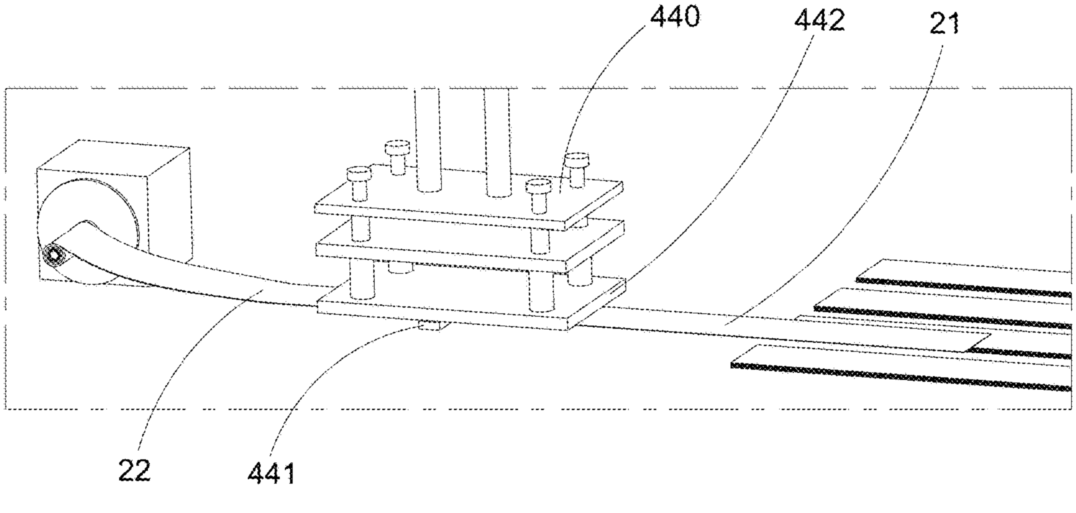

Referring to FIGS. 24A, 24B and 24C, the bonding arrangement 440 comprises a pressing block 441 and a thermal pressing piece 442, during the bonding process, the pressing block 441, which is made of thermal conductive material, is placed on the overlapped end edges 2041 of the two adjacent strip parts, and then the thermal pressing piece 442 is moved downward and fuses the end edges 2041 of the two adjacent strip parts by high-frequency waves so as to form a connecting seam between the two adjacent strip parts, so that the material of the surface layers 201 of two adjacent strip parts, such as PVC or TPU material, is fused together.

It is worth mentioning that during the fusing of the strip parts for providing the peripheral enclosing strip 20, with reference to FIGS. 6 and 7, along a clockwise or counter-clockwise direction, the end edge 2041 of each preceding strip part is positioned below the end edge 2041 of the next strip part, or the end edge 2041 of each preceding strip part is positioned above the end edge 2041 of the next strip part, so that thermal bonding device 410 will operate smoothly without material jams.

Figure 25A:
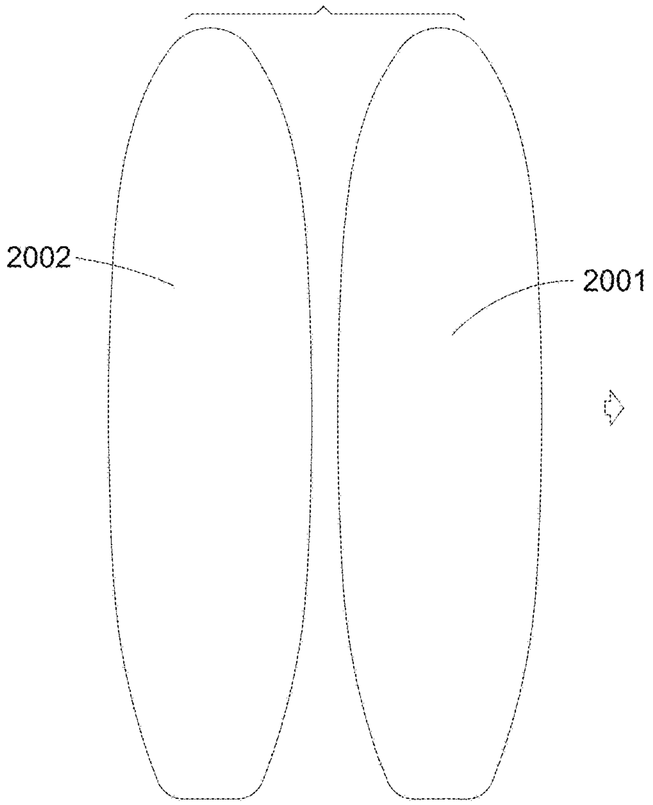
FIGS. 25A, 25B, 25C and 25D are perspective views illustrating two material layers being processed to provide two body layers of the main body of the inflatable paddle board according to the above preferred embodiment of the present invention.
Figure 25B:
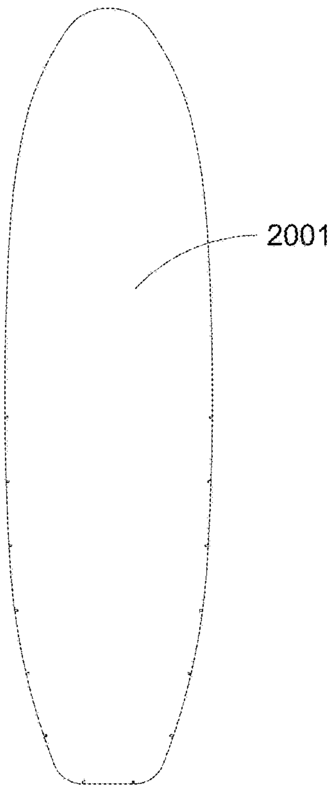
Figure 25D:
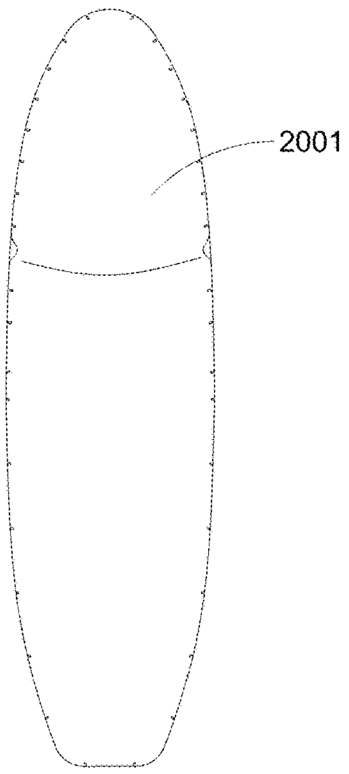
Figure 25C:
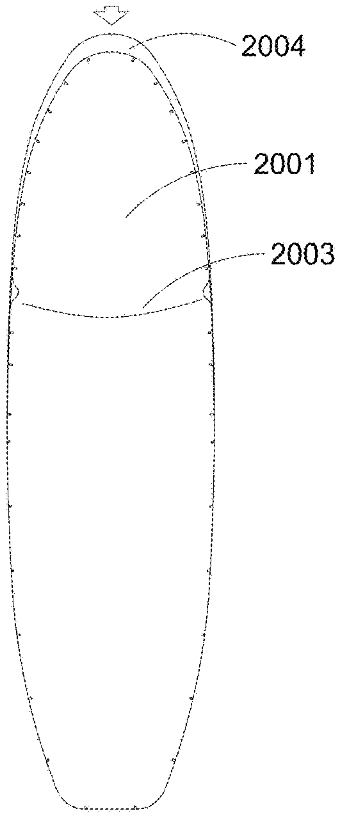
Figure 26:
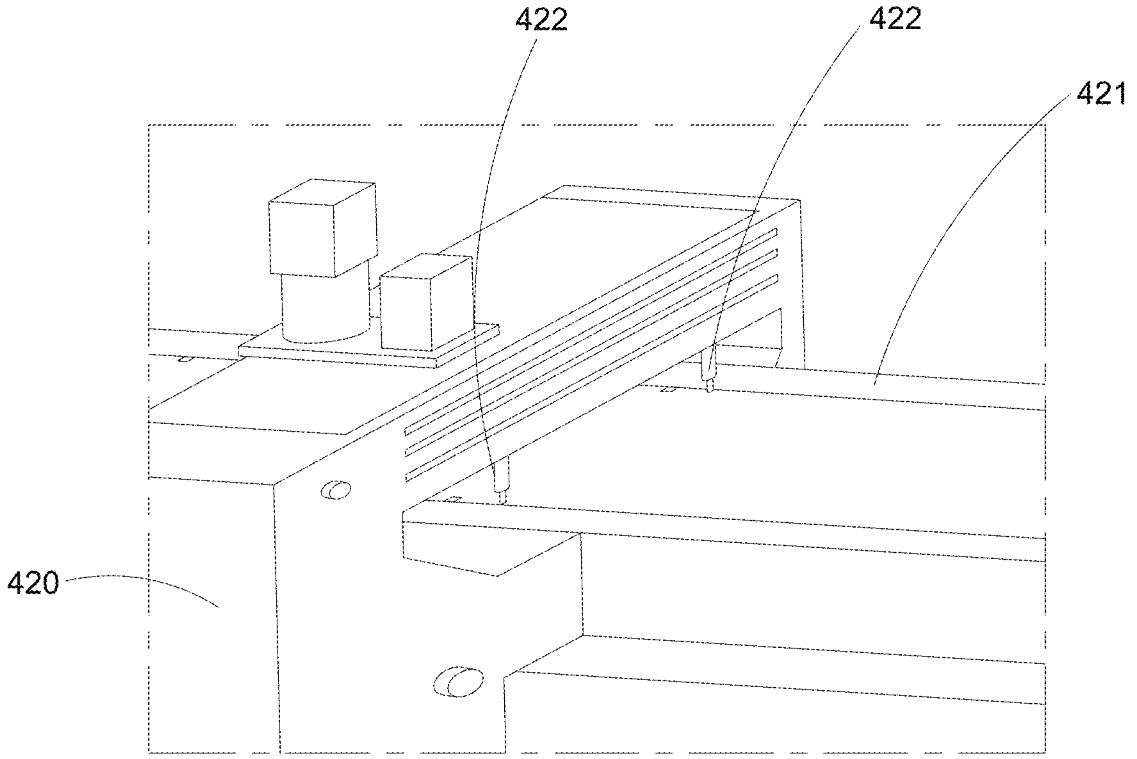
FIG. 26 is a perspective view illustrating a fixing arrangement for temporarily fixing the two material layers according to the above preferred embodiment of the present invention.

As shown in FIG. 25A to 26 of the drawings, before thermal bonding process of the peripheral enclosing strip 20 and the main body 10, the fixing arrangement 420 is employed to temporarily fix the two body layers of the main body 10. In this step, two material layers, which are a top material layer 2001 and a bottom material layer 2002 stacked below the top material layer 2001, are processed to provide the two body layers 11 and 12 of the main body 10.

More specifically, the fixing arrangement 420 comprises a support platform 421 for supporting the two material layers 2001 and 2002 which are drop stitch fabrics, and two pressing posts 422 for temporarily fixing the two material layers 2001 and 2002. Accordingly, the two material layers 2001 and 2002 which are connected by the connecting threads 13 are shaped and sized to match with each other, and then are aligned and overlapped with each other, and the two material layers 2001 and 2002 are then pressed down by driving the two pressing posts 422 to generate virtual solder connection points 2005 between the two material layers 2001 and 2002, so that the two material layers 2001 and 2002 can be fixed and not easily misaligned in the subsequent thermal bonding process.

The two pressing posts 422 are driven to move along the support platform 421 and are respectively pressed down at a predetermined interval to perform the dot-fixing process, so that the two edges of the two material layers 2001 and 2002 are aligned and connected by virtual soldering through a mechanism like high-frequency electric welding, so that the two material layers 2001 and 2002 are temporarily fixed together by dot-pressing. The pressing step starts from the tail of the two material layers 2001 and 2002 until about a half to three quarters of the overall length. As an example, the pressing step stops at two-thirds of the overall length.

This temporary fixing process can be completed automatically by a spot welding machine, or can be completed by a manual process. In addition, in another variant implementation, the edges of the two material layers 2001 and 2002 can also be fixed by a glue.

Figure 27:
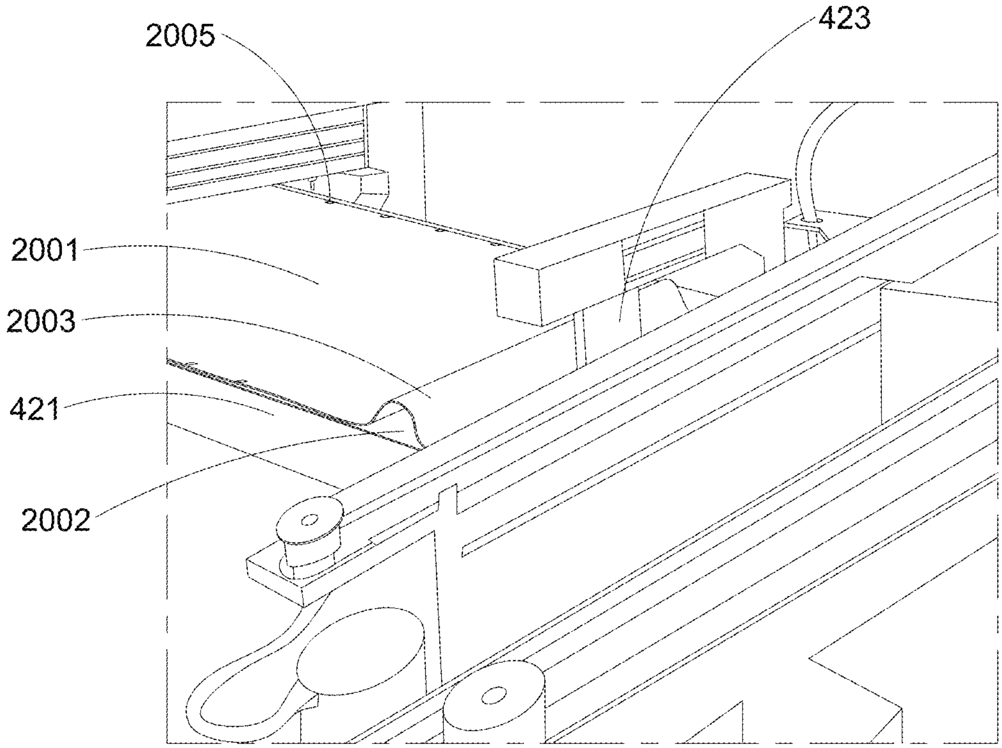
FIG. 27 is a perspective view illustrating a scraping element of the fixing arrangement for causing a top material layer to be wrinkled according to the above preferred embodiment of the present invention.
Figure 28:
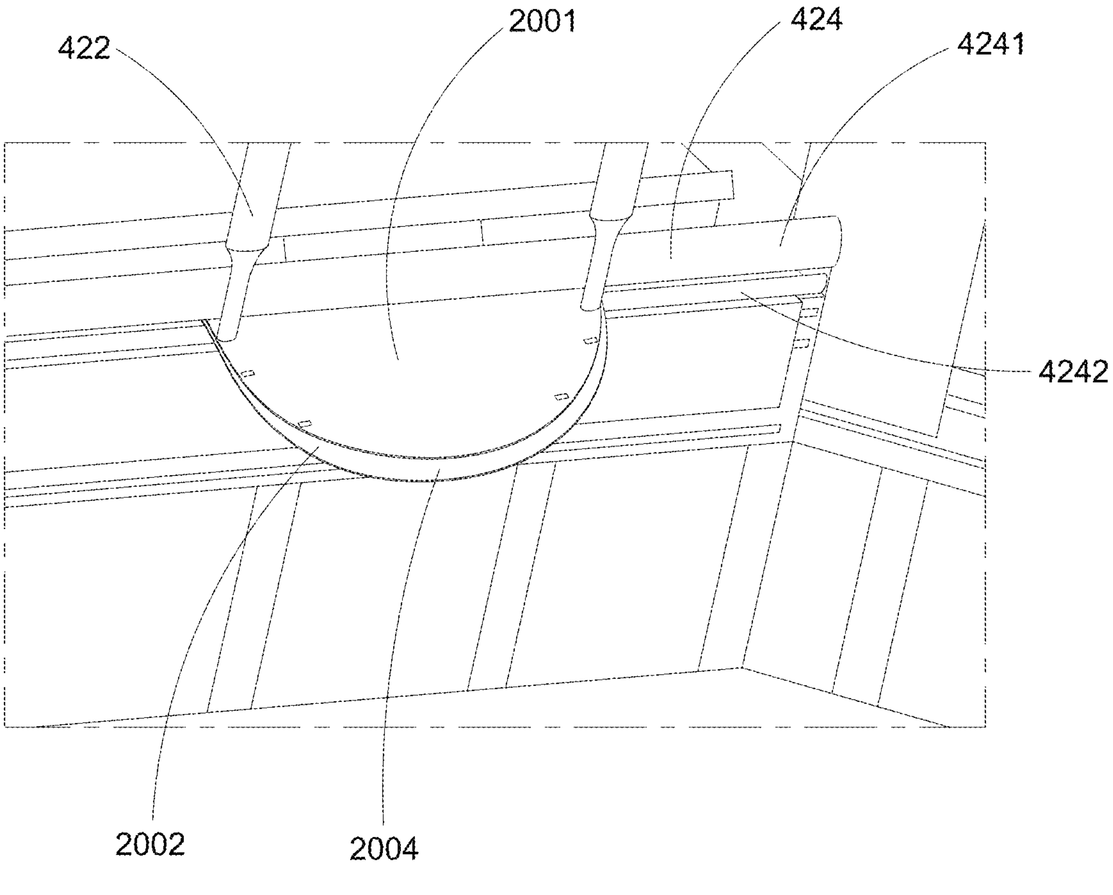
FIG. 28 is a perspective view illustrating a front side of the two material layers to be wrinkled according to the above preferred embodiment of the present invention, wherein a front end portion of the bottom material layer is exposed and not covered by the top material layer.
Figure 29:
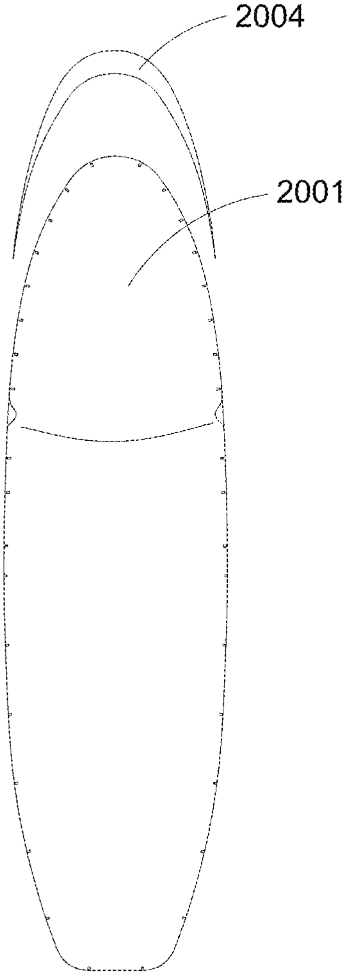
FIG. 29 is a perspective view illustrating a front end portion of the bottom material layer being cut off to provide the two body layers of the main body of the inflatable paddle board according to the above preferred embodiment of the present invention.

In order to form the raised head 1 of the inflatable paddle board 100, as shown in FIGS. 27 to 29, the fixing arrangement 420 further comprises a scraping element 423, and a conveying assembly 424 which comprises an upper conveying member 4241 and a lower conveying member 4242. A head part of the top material layer 2001 is scraped and wrinkled by the scraping element 423, so that a front end of the top material layer 2001 is in a backward position relative to a front end of the lower material layer 2002, a front end portion 2004 of the bottom material layer 2002 is exposed and not covered by the top material layer 2001. Specifically, a lower vacuum cylinder can be used to suck and fix the lower material layer 2002, and then the scraping element 423 can be embodied to comprise an upper vacuum cylinder which sucks the top material layer 2001 and then is driven to move toward the tail of the top material layer 2001, so as to result in a wrinkle part 2003 of the top material layer 2001.

And then, the rest edges of the two material layers 2001 and 2002 are continue to be pressed and fixed, wherein the conveying speeds of the upper conveying member 4241 and the lower conveying member 4242 are different, specifically, the speed of the upper conveying member 4241 is greater than that of the lower conveying member 4242, and the top material layer 2001 will be temporarily fixed with the bottom material layer 2002 during the pressing process and produce small wrinkles, and the pressing step continues until no wrinkle is on the top material layer. Then, the excess part front end portion 2004 of the bottom material layer is cut off. It can be understood that in the finished product, the bottom material layer 2002 without the front end portion 2004 is the top body layer 11 of the finished product, and its length is relatively reduced because the front end portion 2004 is cut off, the top material layer 2001 is the bottom body layer 12 of the finished product, so that the two body layers 11 and 12 are inflated to form a structure with the raised head 1.

After the front end portion 2004 of the bottom material layer 2002 is cut off, and the two front edges of the material layers will be aligned with each other. In other words, the bending edges 1011 of the two body layers 11 and 12 at the head portion 101 of the main body 10 are aligned and overlapped with each other and have a same perimeter length, and then the peripheral enclosing strip 20 is thermally bonded to the edges of the body layers 11 and 12. Since the edges between the two body layers 11 and 12 are temporarily fixed, after inflation, the temporarily fixed two body layers 11 and 12 will be spaced part from each other, and the length difference between the body layers 11 and 12 at the head portion 101 of the main body 10 will result in the raised head 1 of the inflated inflatable paddle board 100.

When the inflatable paddle board 100 is not required to form the raised head 1, there will be no need for scraping the top material layer 2001 and cutting the front end portion 2004 of the bottom material layer 2002.

Figure 31:
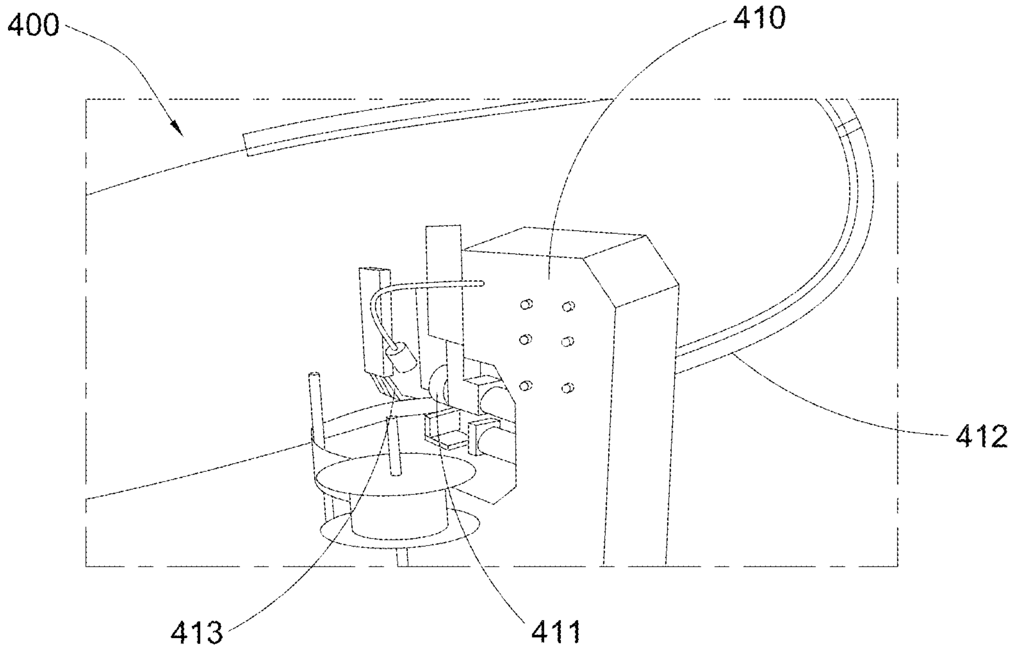
FIG. 31 is a schematic view illustrating a thermal bonding device for bonding the peripheral enclosing strip to the two body layers of the main body of the inflatable paddle board according to the above preferred embodiment of the present invention.

Referring to FIG. 31, the thermal bonding device 410 comprises a pressing roller assembly 411, a support table 412, two hot air blowers 413, and a vacuum generation unit for sucking the main body 10, so as to fix the main body 10. In the thermal bonding process, the peripheral enclosing strip 20 is wrapped on the edges of the two body layers 11 and 12 of the main body 10 to ensure that the edges of the two are not misaligned. The bottom body layer 12 which is made from the top material layer 2001 is placed on top of the top body layer 11 which is made from the bottom material layer 2002. The peripheral enclosing strip 20 covers the edges of the two body layers 11 and 12 and the body layers 11 and 12 are fixed by the vacuum generation unit. Then the two body layers 11 and 12 are placed between two rollers of the pressing roller assembly 411, and the hot air blowers 413 will blow hot air to the peripheral enclosing strip 20 and the two body layers 11 and 12 to a melting temperature, so that the contact surface between the peripheral enclosing strip 20 and the drop stitch fabrics of the two body layers 11 and 12 is in a molten state, and the heating speed and temperature uniformity are controlled to avoid local overheating or insufficient heating. In addition, a laser positioning mechanism can also be employed to ensure the precise placement of the two body layers 11 and 12, so as to allow the thermal bonding device 410 to move more evenly around the perimeter of the two body layers 11 and 12 and the peripheral enclosing strip 20.

The nozzle temperature of the hot air blowers 413 ranges from 400° C. to 800° C., without direct contact with the peripheral enclosing strip 20. The hot air pressure is between 200 MPa to 350 MPa, so as to blow-melt the peripheral enclosing strip 20. A distance between the upper and lower hot air blowers 413 should be no less than 2 mm to allow the materials to pass through, and a distance between the peripheral enclosing strip 20 and each individual hot air blower 413 should be no more than 2 mm. The processing speed is 50 to 140 meters within 10 minutes.

Figure 32:
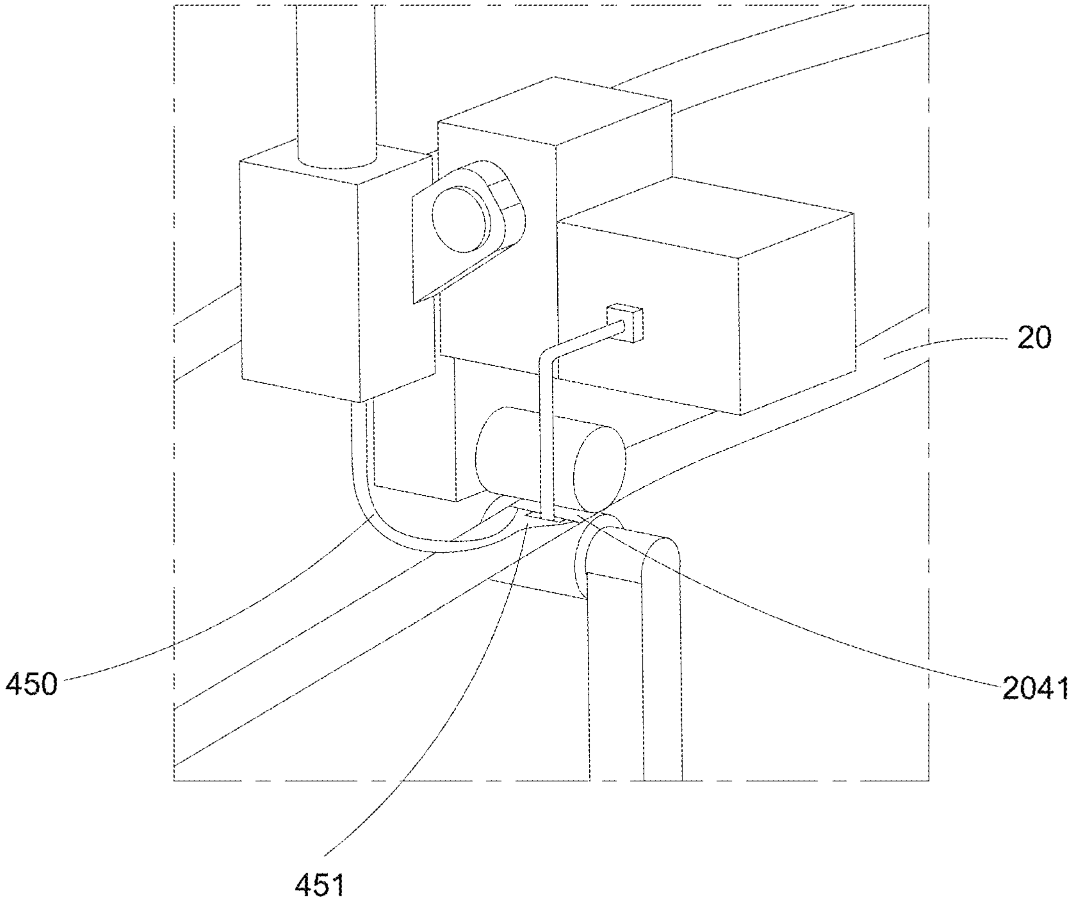
FIG. 32 is a schematic view illustrating an end coupling arrangement for bonding the two end portions of the peripheral enclosing strip of the inflatable paddle board according to the above preferred embodiment of the present invention.

In the thermal bonding process, the two end portions 204 of the peripheral enclosing strip 20 are not bonded with each other, they may be glued together. In this embodiment, as shown in FIG. 32, the end coupling arrangement 450 comprises a thermal heating piece 451 for being driven to be placed at a position corresponding to the two end portions 204 of the peripheral enclosing strip 20 to form the fourth sealing seam 208 for bonding the two end portions 204 of the peripheral enclosing strip 20 as well as further bonding the two end portions 204 of the peripheral enclosing strip 20 to the two body layers 11 and 12. The thermal heating piece 451 can also be supplied with hot air.

Figure 30:
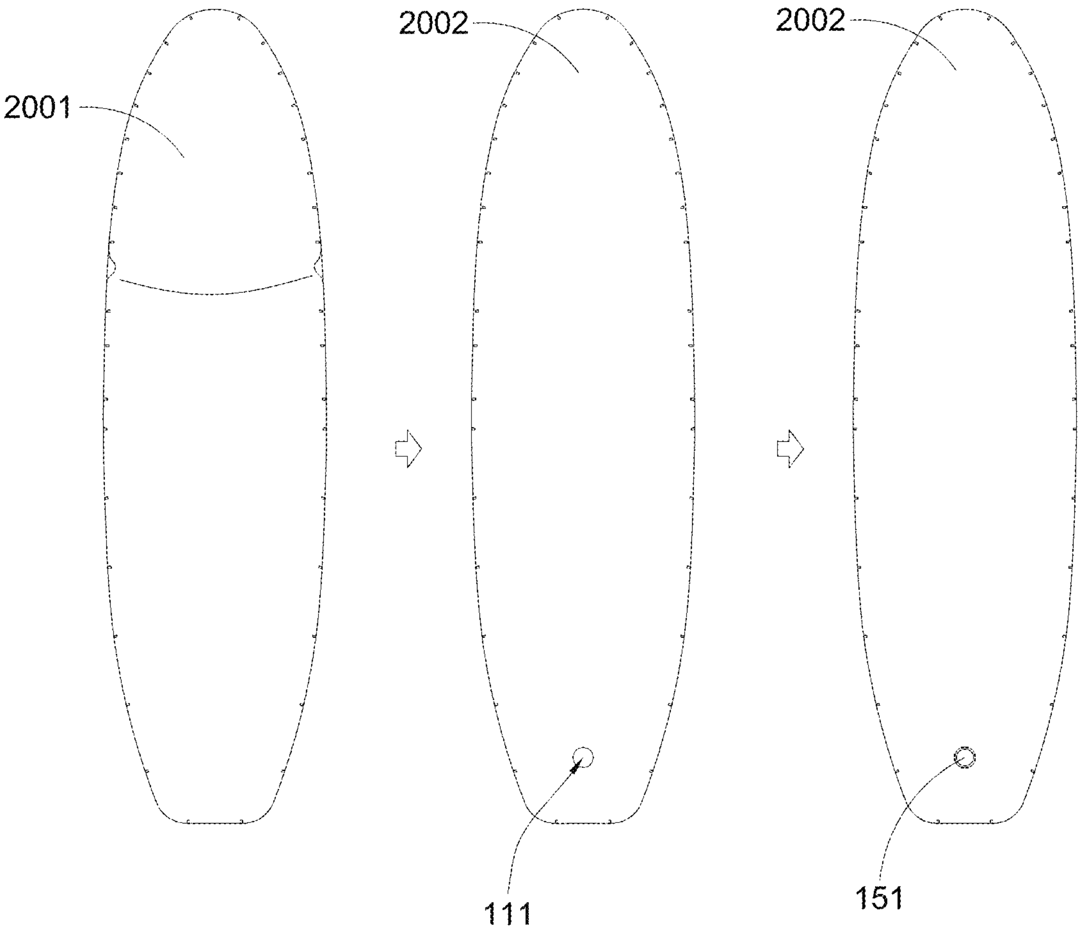
FIG. 30 is a schematic view illustrating a hole being formed to dispose a valve seat of an inflation valve of the inflatable paddle board according to the above preferred embodiment of the present invention.
Figure 33:
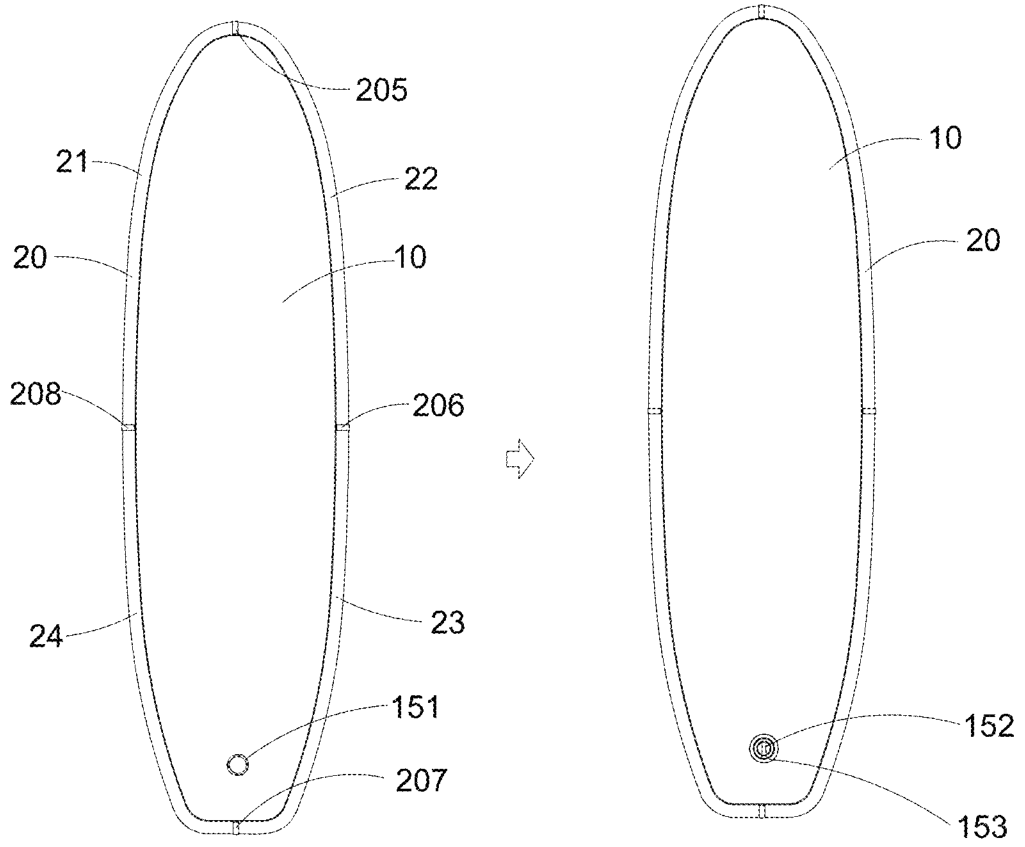
FIG. 33 is a schematic view illustrating a valve body being installed to the main body of the inflatable paddle board according to the above preferred embodiment of the present invention.

In addition, as shown in FIG. 30, before the thermal bonding process, a hole 111 is formed in the top body layer 11, a valve seat 151 of the inflation valve 15 can be disposed in the inflation chamber 14. After the thermal bonding process, a valve body 152 can be mounted to the valve seat 151. In addition, one or more sealing layers can be disposed at the hole 111 for enhancing the sealing effect. An inner sealing layer, which can have a material configuration as the decoration strip 30, has a larger thickness for enhancing the cushioning effect. Two outer sealing layers 153, as shown in FIG. 33 of the drawings, which can have a material configuration as the peripheral enclosing strip 20 and have a smaller thickness can be disposed on the outer surface of the top body layer 11 between the valve body 152 and the top body layer 11, so as to prevent air leakage when the valve body 152 is mounted on the valve seat 151.

Figure 35:
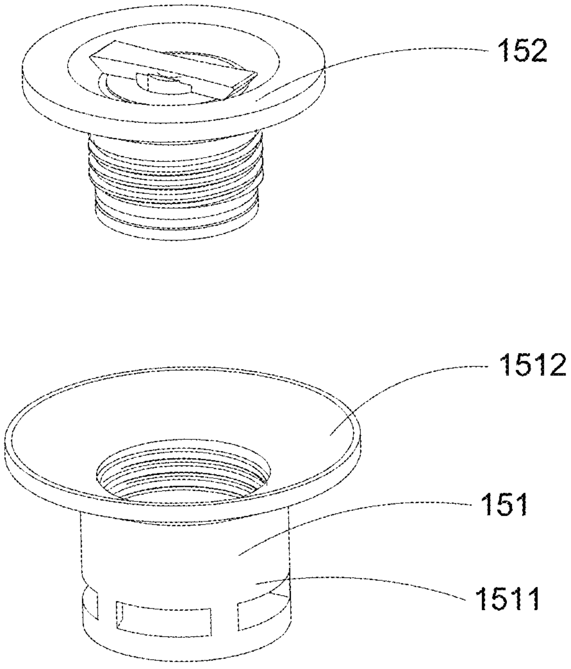
FIG. 35 is an exploded view of an inflation valve of the inflatable paddle board according to the above preferred embodiment of the present invention.

As shown in FIG. 35, the valve seat 151 comprises a seat body 1511 and a sealing ring body 1512 integrally extended from the seat body 1511, the valve body 152 can be screwed to the seat body 1511. A diameter of the sealing ring body 1512 is larger than a diameter of the hole 111 of the top body layer 11, so as to ensure the sealing effect. Before the thermal bonding process of the peripheral enclosing strip 20, the valve seat 151 is placed into the space between the two body layers 11 and 12 from a side of the main body 10. In the thermal bonding process of the peripheral enclosing strip 20, the support table 412 is provided with a placement groove for the placement of the valve seat 151, so as to ensure the horizontal placement of the main body 10. After the thermal bonding process of the peripheral enclosing strip 20, the valve body 152 is assembled on the valve seat 151 through the hole 111 of the top body layer 11.

Figure 34:
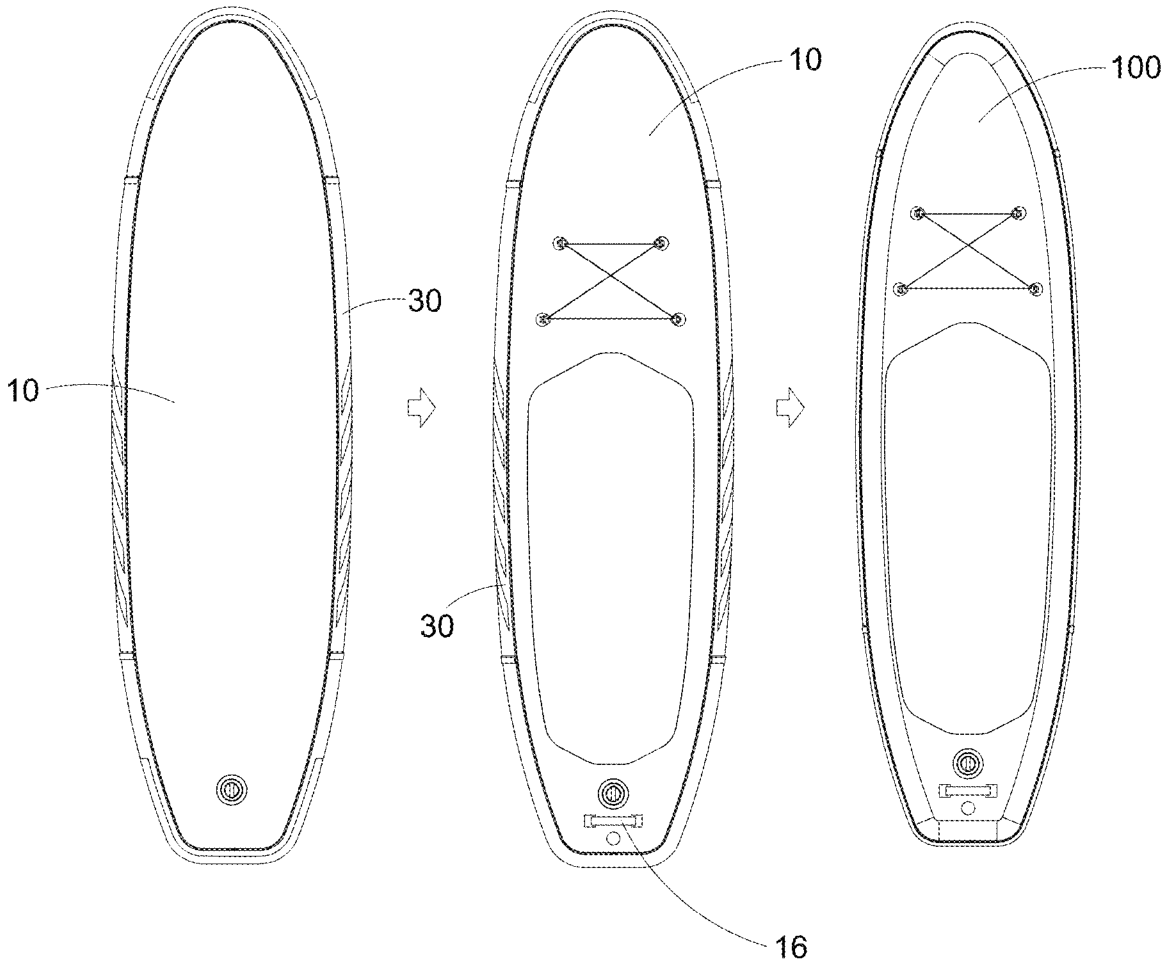
FIG. 34 is a schematic view illustrating accessories being installed to the main body of the inflatable paddle board according to the above preferred embodiment of the present invention.

As shown in FIG. 34 of the drawings, accessories 16 can be mounted to the main body 10, so as to provide the finished product of the inflatable paddle board 100.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. An inflatable paddle board, comprising:

a main body comprising a head portion, wherein the head portion comprises a top head layer and a bottom head layer; and a peripheral enclosing strip which is thermally bonded with the main body to form an inflation chamber, wherein a length of the top head layer is smaller than a length of the bottom head layer, so as to cause the inflatable paddle board to form a raised head when the inflation chamber is inflated;

wherein the main body comprises two body layers, the top head layer and the bottom head layer are respectively parts of the two body layers, the peripheral enclosing strip is integrated with the two body layers to define the inflation chamber;

wherein each of the top head layer and the bottom head layer comprises a bending edge, during a thermal bonding process between the two body layers and the peripheral enclosing strip, the bottom head layer having a larger length is wrinkled on the top head layer, the bending edges of the top head layer and the bottom head layer are aligned and overlapped with each other in an edge-to-edge manner, the peripheral enclosing strip is wrapped on and thermally bonded to the bending edges of the top head layer and the bottom head layer, after the thermal bonding process, the top head layer is capable of being spaced apart from the bottom head layer to cause the inflatable paddle board to form the raised head when the inflation chamber is inflated;

wherein the main body comprises a plurality of connecting threads connected between the two body layers, a width of a portion of the peripheral enclosing strip between edges of the two body layers of the main body is smaller than a height of the connecting threads between the two body layers, wherein the connecting threads between the edges of the two body layers of the main body are cut off in the middle.

2. An inflatable paddle board, comprising:

a main body comprising a head portion, wherein the head portion comprises a top head layer and a bottom head layer; and a peripheral enclosing strip which is thermally bonded with the main body to form an inflation chamber, wherein a length of the top head layer is smaller than a length of the bottom head layer, so as to cause the inflatable paddle board to form a raised head when the inflation chamber is inflated;

wherein the main body comprises two body layers, the top head layer and the bottom head layer are respectively parts of the two body layers, the peripheral enclosing strip is integrated with the two body layers to define the inflation chamber;

wherein the peripheral enclosing strip comprises a plurality of strip parts which are connected with each other, wherein the plurality of strip parts comprises a first strip part and a second strip part which are connected with other and are thermally bonded with said top head layer and said bottom head layer at two sides of the head portion, wherein the first strip part and the second strip part are integrated with each other without requiring a glue to bond the two adjacent strip parts;

wherein each of the first strip part and the second strip part comprises two surface layers and a mesh layer between the two surface layers, each mesh layer comprises a plurality of first yarns and a plurality of second yarns which are perpendicular to each other;

wherein the plurality of first yarns and the plurality of second yarns are respectively inclined with respect to a length direction of the peripheral enclosing strip.

3. The inflatable paddle board according to claim 2, wherein each of the top head layer and the bottom head layer comprises a bending edge, during a thermal bonding process between the two body layers and the peripheral enclosing strip, the bending edges of the top head layer and the bottom head layer are aligned and overlapped with each other in an edge-to-edge manner, the peripheral enclosing strip is wrapped on the bending edges of the top head layer and the bottom head layer, after the thermal bonding process, the top head layer is spaced apart from the bottom head layer to cause the inflatable paddle board to form the raised head when the inflation chamber is inflated.

4. The inflatable paddle board according to claim 3, wherein an inclined angle between the first yarn and the length direction of the peripheral enclosing strip is 30°-60°.

5. An inflatable paddle board, comprising:

a main body comprising a head portion, wherein the head portion comprises a top head layer and a bottom head layer;

a peripheral enclosing strip which is thermally bonded with the main body to form an inflation chamber, wherein a length of the top head layer is smaller than a length of the bottom head layer, so as to cause the inflatable paddle board to form a raised head when the inflation chamber is inflated, wherein the main body comprises two body layers, the top head layer and the bottom head layer are respectively parts of the two body layers, the peripheral enclosing strip is integrated with the two body layers to define the inflation chamber; and a decoration strip which is attached on the peripheral enclosing strip, the decoration strip comprises a plurality of strip parts each comprising a plurality of first yarns and a plurality of second yarns which are perpendicular to each other, wherein the first yarns and the second yarns in one or more strip part of the plurality of strip parts are inclined yarns with respect to a length direction of the peripheral enclosing strip.

6. An inflatable paddle board, comprising:

a main body comprising a head portion, wherein the head portion comprises a top head layer and a bottom head layer; and a peripheral enclosing strip which is thermally bonded with the main body to form an inflation chamber, wherein a length of the top head layer is smaller than a length of the bottom head layer, so as to cause the inflatable paddle board to form a raised head when the inflation chamber is inflated;

wherein the main body comprises two body layers, the top head layer and the bottom head layer are respectively parts of the two body layers, the peripheral enclosing strip is integrated with the two body layers to define the inflation chamber;

wherein each of the top head layer and the bottom head layer comprises a bending edge, during a thermal bonding process between the two body layers and the peripheral enclosing strip, the bottom head layer having a larger length is wrinkled on the top head layer, the bending edges of the top head layer and the bottom head layer are aligned and overlapped with each other in an edge-to-edge manner, the peripheral enclosing strip is wrapped on and thermally bonded to the bending edges of the top head layer and the bottom head layer, after the thermal bonding process, the top head layer is capable of being spaced apart from the bottom head layer to cause the inflatable paddle board to form the raised head when the inflation chamber is inflated;

wherein the peripheral enclosing strip comprises a plurality of strip parts which are thermally bonded to each other, wherein between the two end portions of the peripheral enclosing strip, along one of a clockwise direction and a counterclockwise direction, an end edge of each preceding strip part of the strip body is positioned above an end edge of the next strip part.

7. An inflatable paddle board, comprising:

a main body comprising a head portion, wherein the head portion comprises a top head layer and a bottom head layer; and a peripheral enclosing strip which is thermally bonded with the main body to form an inflation chamber, wherein a length of the top head layer is smaller than a length of the bottom head layer, so as to cause the inflatable paddle board to form a raised head when the inflation chamber is inflated;

wherein the main body comprises two body layers, the top head layer and the bottom head layer are respectively parts of the two body layers, the peripheral enclosing strip is integrated with the two body layers to define the inflation chamber;

wherein each of the top head layer and the bottom head layer comprises a bending edge, during a thermal bonding process between the two body layers and the peripheral enclosing strip, the bottom head layer having a larger length is wrinkled on the top head layer, the bending edges of the top head layer and the bottom head layer are aligned and overlapped with each other in an edge-to-edge manner, the peripheral enclosing strip is wrapped on and thermally bonded to the bending edges of the top head layer and the bottom head layer, after the thermal bonding process, the top head layer is capable of being spaced apart from the bottom head layer to cause the inflatable paddle board to form the raised head when the inflation chamber is inflated;

wherein the peripheral enclosing strip comprises a plurality of strip parts which are connected end-to-end with each other, wherein the plurality of strip parts comprises a first strip part and a second strip part which are connected with each other and are thermally bonded with said top head layer and said bottom head layer at two sides of the head portion, wherein two strip materials are cut from a same strip material to provide the first strip part and the second strip part, a first strip material of the two strip materials is thermally bonded to the head portion while a second strip material of the two strip materials is flipped and then thermally bonded to the head portion, wherein each of the first strip part and the second strip part comprises two surface layers and a mesh layer between the two surface layers, each mesh layer comprises a plurality of first yarns and a plurality of second yarns which are connected to each other and inclined, wherein the first strip part and the second strip part are configured with different yarn patterns when the second strip material of the two strip materials is flipped.

8. The inflatable paddle board according to claim 7, wherein the plurality of first yarns and the plurality of second yarns of each mesh layer are configured to be inclined with respect to a length direction of the peripheral enclosing strip.

9. An inflatable paddle board, comprising:

a main body comprising a head portion, wherein the head portion comprises a top head layer and a bottom head layer; and a peripheral enclosing strip which is thermally bonded with the main body to form an inflation chamber, wherein a length of the top head layer is smaller than a length of the bottom head layer, so as to cause the inflatable paddle board to form a raised head when the inflation chamber is inflated;

wherein the main body comprises two body layers, the top head layer and the bottom head layer are respectively parts of the two body layers, the peripheral enclosing strip is integrated with the two body layers to define the inflation chamber;

wherein the main body comprises a plurality of connecting threads connected between the two body layers, a width of a portion of the peripheral enclosing strip between edges of the two body layers of the main body is smaller than a height of the connecting threads between the two body layers, wherein the connecting threads between the edges of the two body layers of the main body are cut off in the middle.

10. An inflatable paddle board, comprising:

a main body comprising a head portion, wherein the head portion comprises a top head layer and a bottom head layer; and a peripheral enclosing strip which is thermally bonded with the main body to form an inflation chamber, wherein a length of the top head layer is smaller than a length of the bottom head layer, so as to cause the inflatable paddle board to form a raised head when the inflation chamber is inflated;

wherein the peripheral enclosing strip comprises a plurality of strip parts which are connected end-to-end with each other, wherein the plurality of strip parts comprises a first strip part and a second strip part which are connected with each other and are thermally bonded with said top head layer and said bottom head layer at two sides of the head portion, wherein two strip materials are cut from a same strip material to provide the first strip part and the second strip part, a first strip material of the two strip materials is thermally bonded to the head portion while a second strip material of the two strip materials is flipped and then thermally bonded to the head portion, wherein each of the first strip part and the second strip part comprises two surface layers and a mesh layer between the two surface layers, each mesh layer comprises a plurality of first yarns and a plurality of second yarns which are connected to each other and inclined, wherein the first strip part and the second strip part are configured with different yarn patterns when the second strip material of the two strip materials is flipped.

* * * * *